(12) United States Patent
Nagayama et al.

(10) Patent No.: US 8,875,503 B2
(45) Date of Patent: Nov. 4, 2014

(54) EXHAUST GAS-COOLING PIPE ELEMENT AND INTERNAL COMBUSTION ENGINE EXHAUST SYSTEM

(75) Inventors: Tsukasa Nagayama, Toyota (JP); Hitoshi Uda, Toyota (JP); Junji Watanabe, Toyota (JP); Akihiro Hosono, Toyota (JP)

(73) Assignees: Toyota Jidosha Kabushiki Kaisha, Toyota-shi (JP); Aisin Takaoka Co., Ltd., Toyota-shi (JP)

( * ) Notice: Subject to any disclaimer, the term of this patent is extended or adjusted under 35 U.S.C. 154(b) by 725 days.

(21) Appl. No.: 13/053,657

(22) Filed: Mar. 22, 2011

(65) Prior Publication Data

US 2011/0232274 A1 Sep. 29, 2011

(30) Foreign Application Priority Data

Mar. 23, 2010 (JP) .................................. 2010-066973

(51) Int. Cl.
*F01N 3/04* (2006.01)
(52) U.S. Cl.
CPC . *F01N 3/046* (2013.01); *Y02T 10/20* (2013.01)
USPC .......................................................... 60/321
(58) Field of Classification Search
USPC .................................................. 60/320, 321
See application file for complete search history.

(56) References Cited

U.S. PATENT DOCUMENTS 7,503,819 B1 * 3/2009 Jaeger et al. ................. 440/88 C

FOREIGN PATENT DOCUMENTS

| JP | 63-100624 U | 6/1988 | |
| JP | 63-215809 A | 9/1988 | |
| JP | 63212712 A * | 9/1988 | ................ F01N 7/10 |
| JP | 6415718 U | 1/1989 | |
| JP | 02-096423 U | 8/1990 | |
| JP | 11049095 A | 2/1999 | |

OTHER PUBLICATIONS

Japanese Office Action issued Dec. 13, 2011 from JP 2010-066973 with partial English translation.

* cited by examiner

*Primary Examiner* — Kenneth Bomberg
*Assistant Examiner* — Jonathan Matthias
(74) *Attorney, Agent, or Firm* — Gifford, Krass, Sprinkle, Anderson & Citkowski, P.C.

(57) ABSTRACT

In an exhaust gas-cooling pipe element provided between an exhaust port of an internal combustion engine and an exhaust branch pipe, a center axis of an exhaust introduction opening that is connected to the exhaust port and a center axis of an exhaust discharge opening that is connected to the exhaust branch pipe are placed out of alignment with each other.

11 Claims, 31 Drawing Sheets

F I G . 23
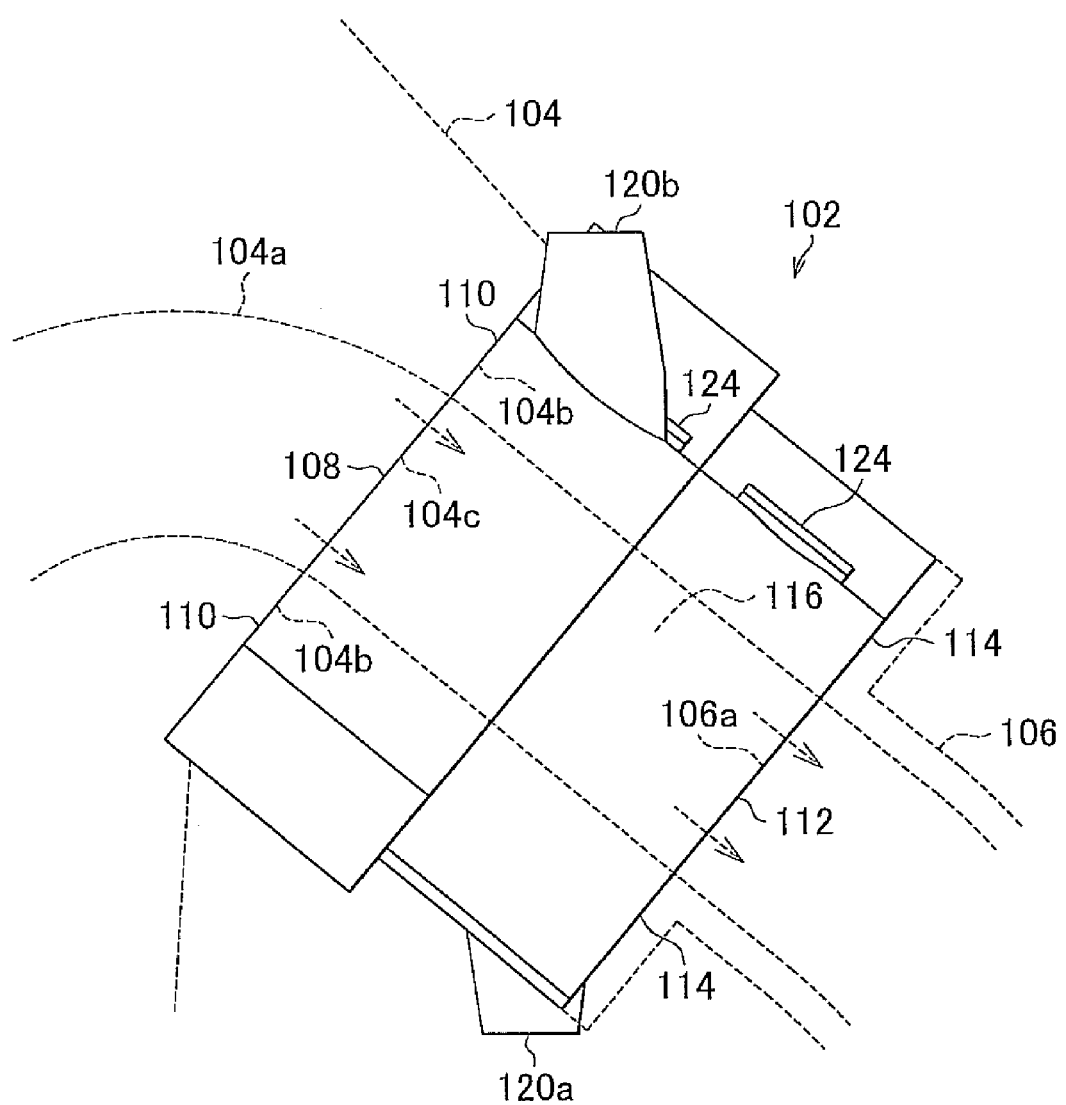

F I G . 30
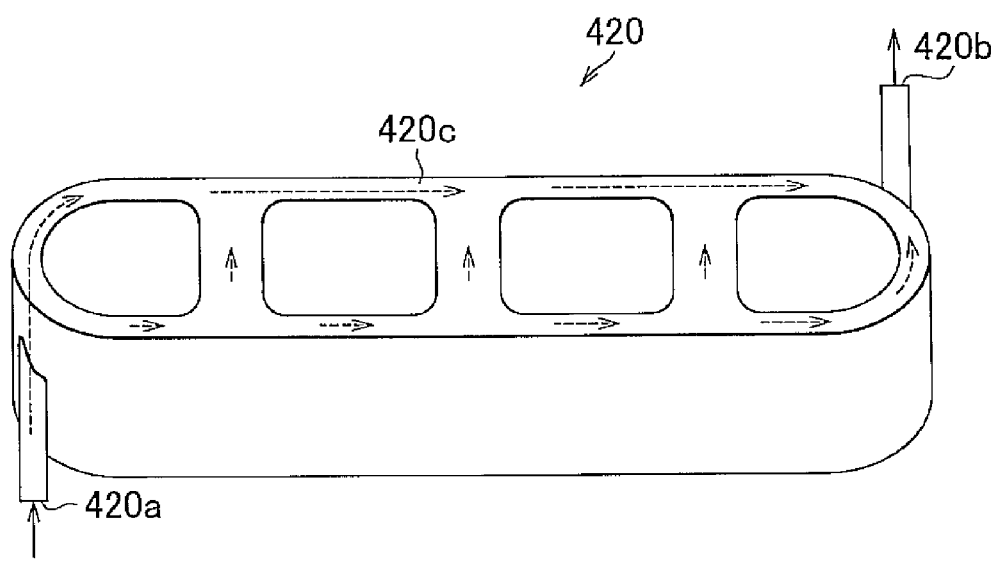

EXHAUST GAS-COOLING PIPE ELEMENT AND INTERNAL COMBUSTION ENGINE EXHAUST SYSTEM

INCORPORATION BY REFERENCE

This application claims priority to Japanese Patent Application No. 2010-066973 filed on Mar. 23, 2010, which is incorporated herein by reference in its entirety including the specification, drawings and abstract.

BACKGROUND OF THE INVENTION

1. Field of the Invention

The invention relates to an exhaust gas-cooling pipe element provided between an exhaust port and an exhaust branch pipe of an internal combustion engine, and to an internal combustion engine exhaust system in which an exhaust gas-cooling pipe element is disposed between an exhaust port and an exhaust branch pipe.

2. Description of the Related Art

A technology of preventing heat damage or adverse heat effect in an exhaust system of an internal combustion engine by disposing a cooling adaptor that corresponds to an exhaust gas-cooling pipe element between the cylinder head and the exhaust manifold is disclosed in, for example, Japanese Utility Model Application Publication No. 64-15718 (JP-U-64-15718) (page 1, and FIGS. 2 to 5).

In the cooling adaptor of JP-U-64-15718, exhaust gas discharged from the exhaust ports of the internal combustion engine passes through the cooling adaptor that has pipe wall surfaces parallel to the flow of the exhaust gas, and then flows into the exhaust branch pipes. Mere passage of high-temperature exhaust gas through the cooing adaptor in this manner is not able to achieve sufficient heat exchange between the exhaust gas and the pipe wall of the cooling adaptor. Therefore, it is necessary to enhance the heat exchange efficiency and therefore enhance the cooling capability.

Furthermore, in the cooling adapter of JP-U-64-15718, when water vapor in exhaust gas condenses on the pipe wall surfaces during a warm-up of the internal combustion engine or the like, there is a possibility of the condensate water gathering in a lower portion of the cooling adaptor due to the gravity and then flowing backward toward the exhaust ports of the internal combustion engine.

SUMMARY OF THE INVENTION

The invention provides an exhaust gas-cooling pipe element capable of enhancing the exhaust gas cooling efficiency and preventing backflow of condensate water, and also provides an internal combustion engine exhaust system that employs the exhaust gas-cooling pipe element, and an internal combustion engine exhaust system capable of preventing backflow of condensate water.

An exhaust gas-cooling pipe element according to a first aspect of the invention is an exhaust gas-cooling pipe element provided between an exhaust port of an internal combustion engine and an exhaust branch pipe, wherein a center axis of an exhaust introduction opening that is connected to the exhaust port and a center axis of an exhaust discharge opening that is connected to the exhaust branch pipe are placed out of alignment with each other.

In the case where the exhaust discharge direction of the exhaust port of the internal combustion engine is horizontal or slightly upward, the exhaust discharge opening of a common exhaust gas-cooling pipe element is at the same level as or higher than the exhaust introduction opening thereof. However, in the construction of the first aspect in which the center axis of the exhaust introduction opening and the center axis of the exhaust discharge opening are placed out of alignment with each other, the exhaust discharge opening can be placed below the exhaust introduction opening in the vertical direction.

Due to this, the opening of the exhaust branch pipe can be disposed below, in the vertical direction, the opening of the exhaust port of the internal combustion engine. Therefore, even if condensate water is formed within the exhaust gas-cooling pipe element, the condensate water will flow not to the internal combustion engine side but to the exhaust branch pipe side by gravity, and thus can be discharged therefrom.

Furthermore, since the center axis of the exhaust introduction opening and the center axis of the exhaust discharge opening are placed out of alignment, the exhaust gas having flown into the exhaust introduction opening from the exhaust port flows in a direction that is not parallel to the pipe wall surface of the exhaust gas-cooling pipe element, so that flow of exhaust gas collides with the pipe wall surface. This improves the efficiency of heat exchange between exhaust gas and the pipe wall of the exhaust cooling pipe element, so that the cooling efficiency can be enhanced.

Due to this, the exhaust gas-cooling pipe element in accordance with the first aspect is able to enhance the cooling efficiency and prevent backflow of condensate water.

An internal combustion engine exhaust system in accordance with a second aspect of the invention includes the exhaust gas-cooling pipe element in accordance with the first aspect between the exhaust port of the internal combustion engine and the exhaust branch pipe.

Because of employing the exhaust gas-cooling pipe element in accordance with the first aspect, the internal combustion engine exhaust system in accordance with the second aspect is able to both enhance the efficiency of cooling exhaust gas and prevent backflow of condensate water to the internal combustion engine side.

An internal combustion engine exhaust system in accordance with a third aspect of the invention includes an exhaust gas-cooling pipe element between an exhaust port and an exhaust branch pipe, wherein an opening portion of the exhaust port and an opening portion of the exhaust branch pipe that are connected by the exhaust gas-cooling pipe element are disposed so that the opening portion of the exhaust port is positioned above the opening portion of the exhaust branch pipe in a vertical direction.

According to the internal combustion engine exhaust system in accordance with the third aspect which includes the exhaust gas-cooling pipe element, even if condensate water is formed within the exhaust cooling pipe element, the condensate water flows not to the internal combustion engine side but to the exhaust branch pipe side, so that the backflow of condensate water can be prevented.

BRIEF DESCRIPTION OF THE DRAWINGS

The features, advantages, and technical and industrial significance of this invention will be described below with reference to the accompanying drawings, in which like numerals denote like elements, and wherein:

FIG. 23 is a right-hand side view of the cooling adaptor in accordance with Embodiment 2;

FIG. 30 is a front view of another example of the spatial shape of a water jacket of a cooling adaptor in accordance with Embodiment 4;

DETAILED DESCRIPTION OF EMBODIMENTS

Figure 1:
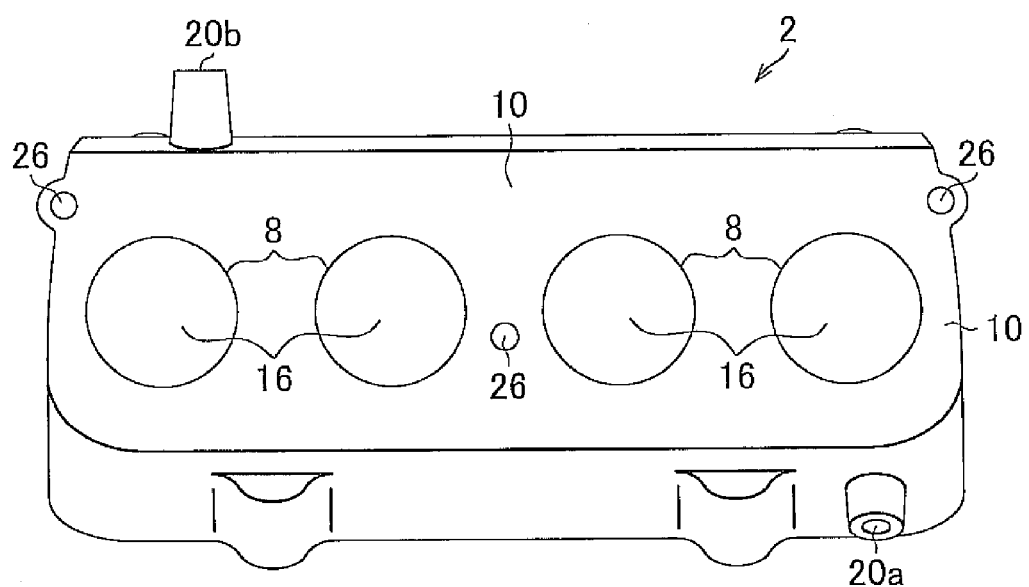
FIG. 1 is a front view of a cooling adaptor in accordance with Embodiment 1 of the invention.
Figure 2:
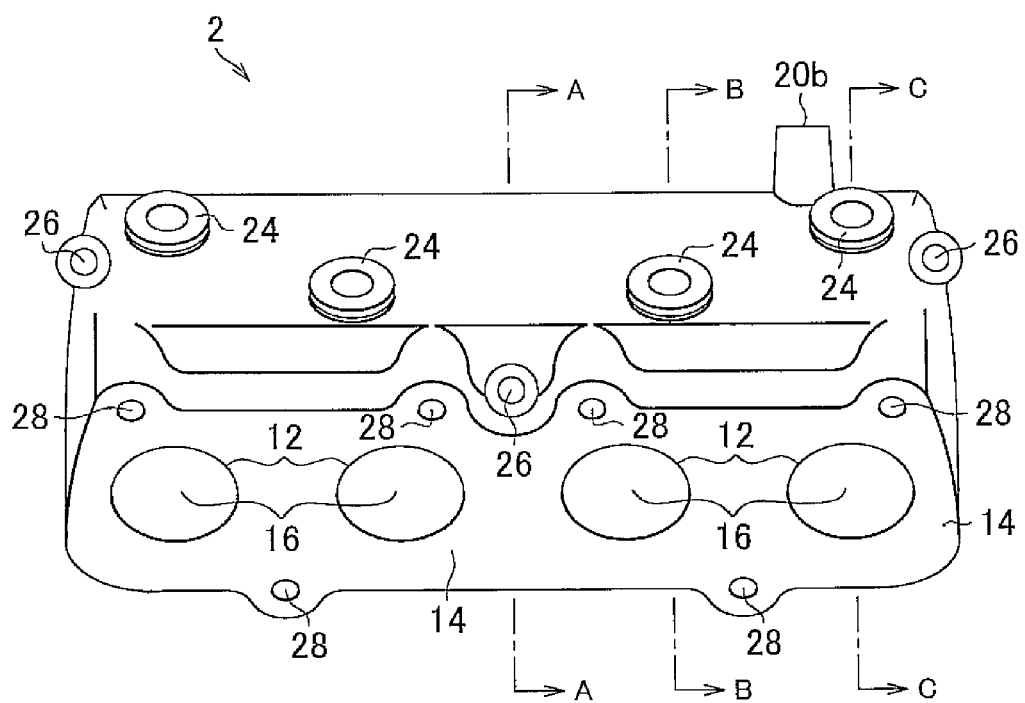
FIG. 2 is a back view of the cooling adaptor in accordance with Embodiment 1 of the invention.
Figure 3:
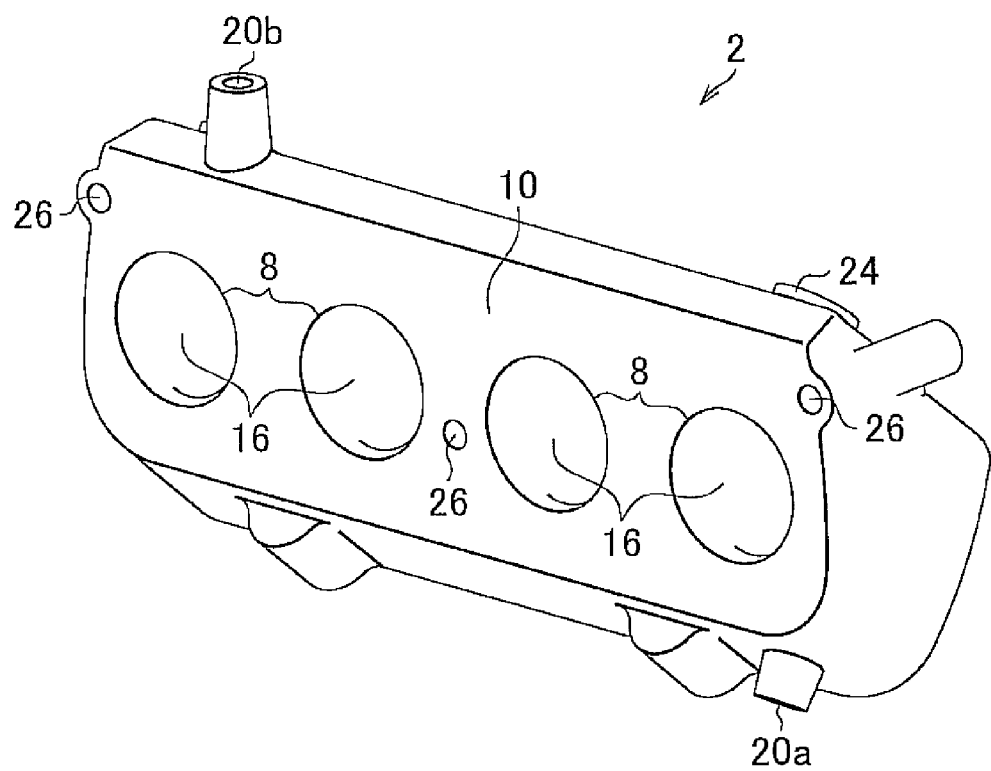
FIG. 3 is a perspective view of the cooling adaptor in accordance with Embodiment 1 which is viewed from a right-hand side in the front view.
Figure 4:
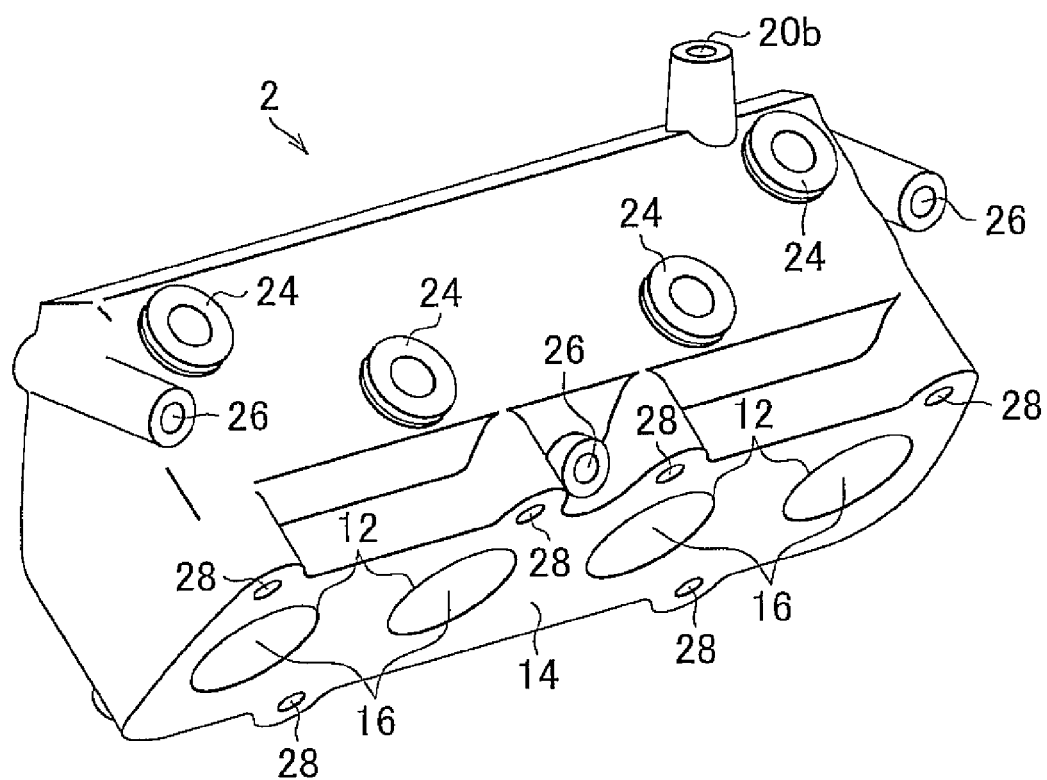
FIG. 4 is a perspective view of cooling adaptor in accordance with Embodiment 1 which is viewed from a left-hand side in the back view.
Figure 5:
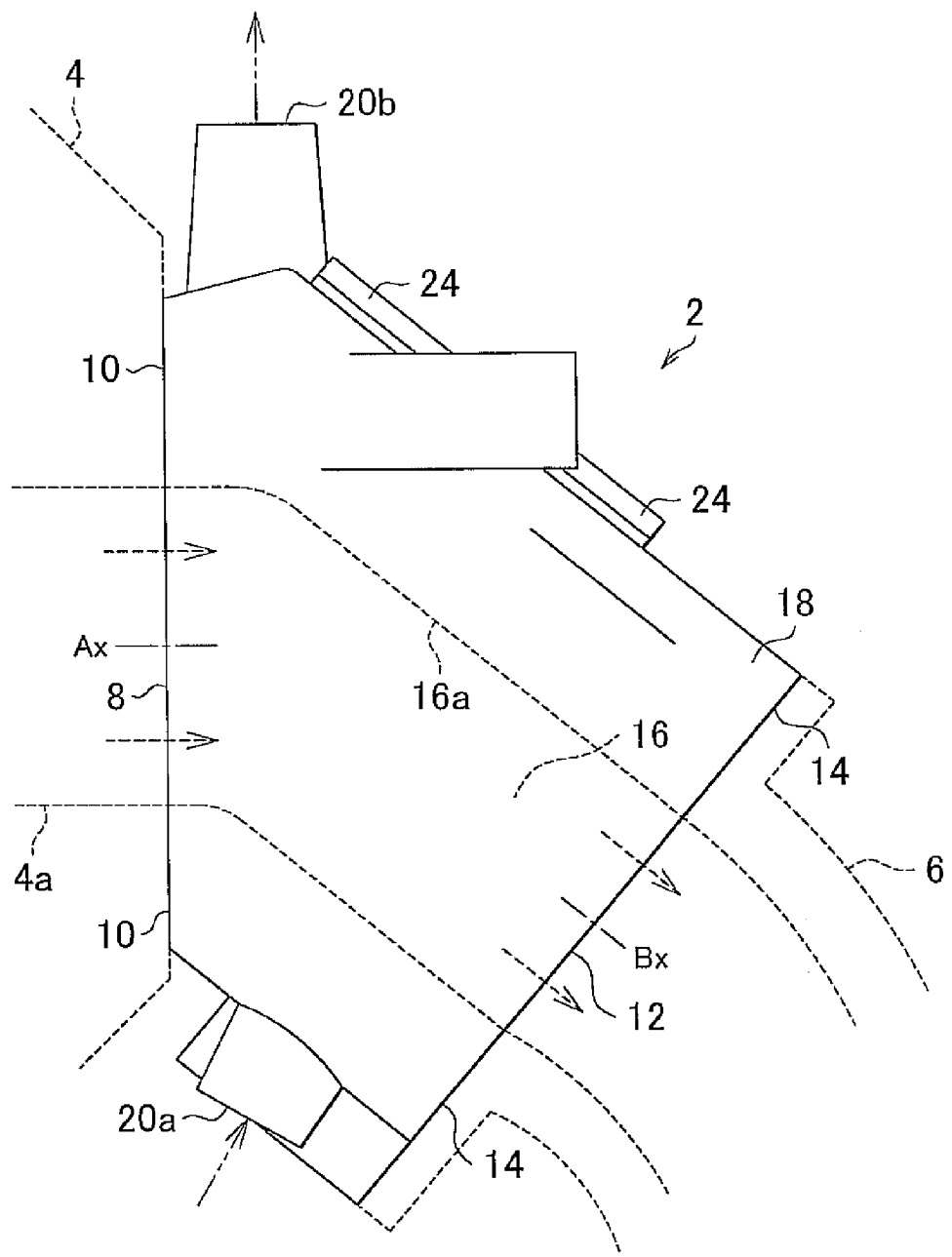
FIG. 5 is a right-hand side view of the cooling adaptor in accordance with Embodiment 1.

FIGS. 1 to 5 show a cooling adaptor 2 as an exhaust gas-cooling pipe element in accordance with Embodiment 1 of the invention. FIG. 1 is a front view of the cooling adaptor 2, FIG. 2 is a back view thereof, FIG. 3 is a perspective view taken from a right-hand side in the front view, FIG. 4 is a perspective view taken from a left-hand side in the back view, and FIG. 5 is a right-hand side view.

The cooling adaptor 2, as shown in FIG. 5, is disposed between exhaust branch pipes 6 and exhaust ports 4a that are formed in a cylinder head 4 of an internal combustion engine, so that the cooling adaptor 2 cools exhaust gas discharged from the engine through the exhaust ports 4a, and then discharges the exhaust gas to the exhaust branch pipe 6 side. In this manner, the cooling adaptor 2 prevents the adverse heat effect in the exhaust system.

The cooling adaptor 2 as described above is cast from a metal material such as an aluminum alloy, an iron alloy, etc. An exhaust upstream side of the cooling adapter 2 is provided with a cylinder head-side connecting surface 10 in which exhaust introduction openings 8 are formed. Incidentally, the internal combustion engine in this embodiment is an in-line four-cylinder engine. Corresponding to this engine configuration, four exhaust introduction openings 8 are arranged in line.

An exhaust downstream side of the cooling adaptor 2 is provided with an exhaust branch pipe-side connecting surface 14 in which exhaust discharge openings 12 are formed. Corresponding to the exhaust introduction openings 8, four exhaust discharge openings 12 are arranged in line. The exhaust introduction openings 8 and the exhaust discharge openings 12 are respectively connected by four exhaust channels 16 that are formed in the cooling adaptor 2.

Figure 6:
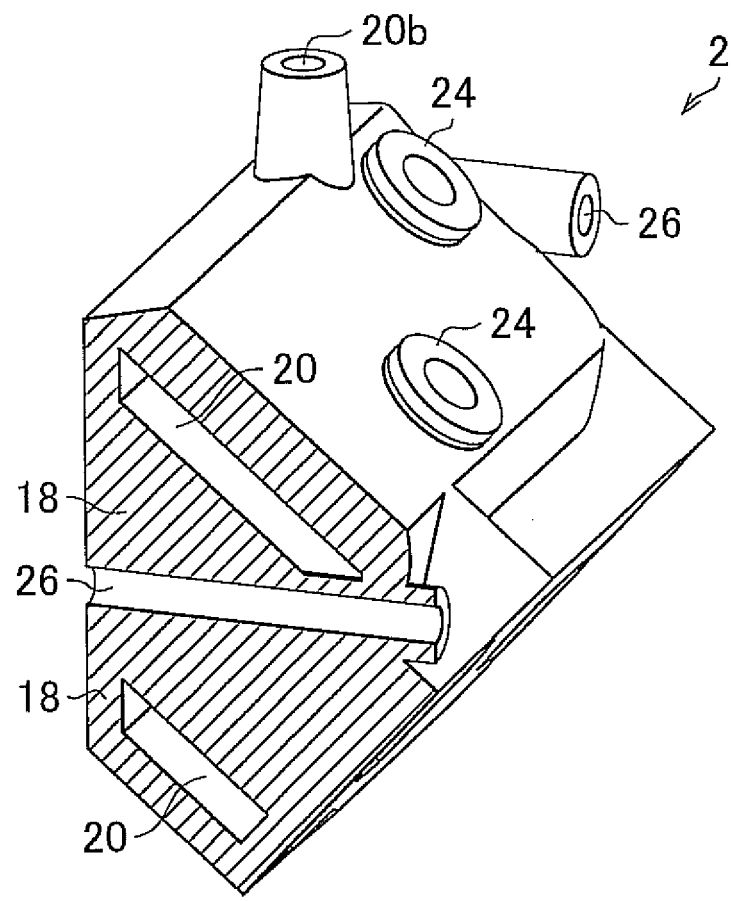
FIG. 6 is a perspective view of the cooling adaptor with a cross-section taken along line A-A of FIG. 2.
Figure 7:
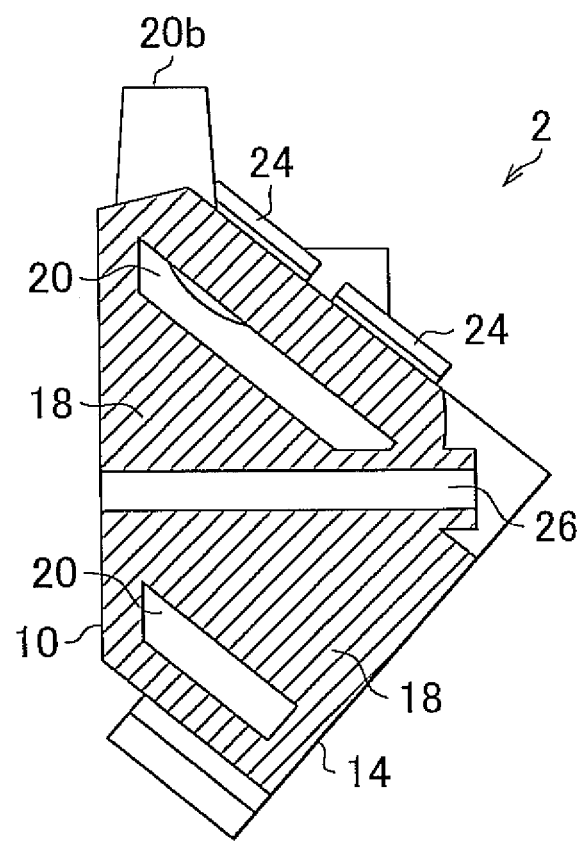
FIG. 7 is a cross-sectional view taken along line A-A of FIG. 2.
Figure 8:
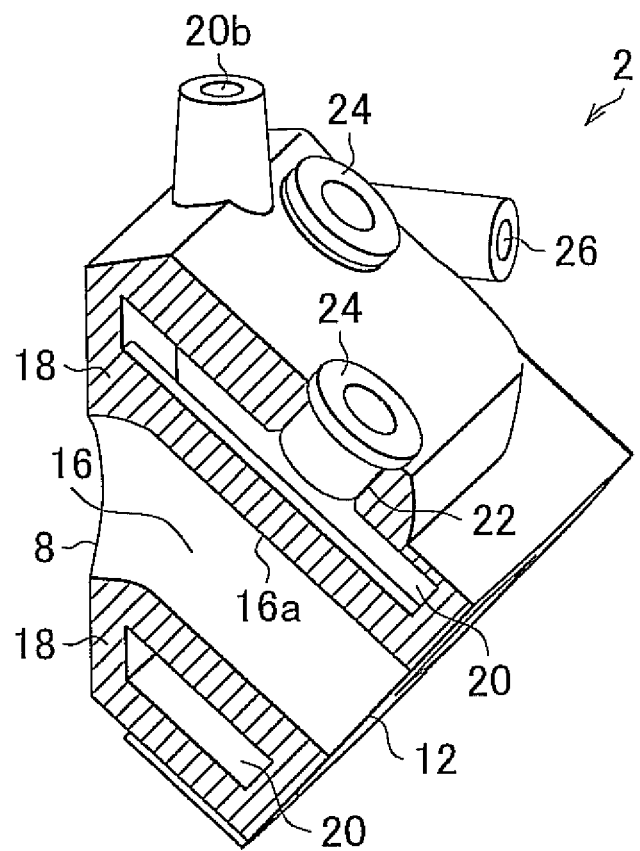
FIG. 8 is a perspective view of the cooling adaptor with a cross-section taken along line B-B of FIG. 2.
Figure 9:
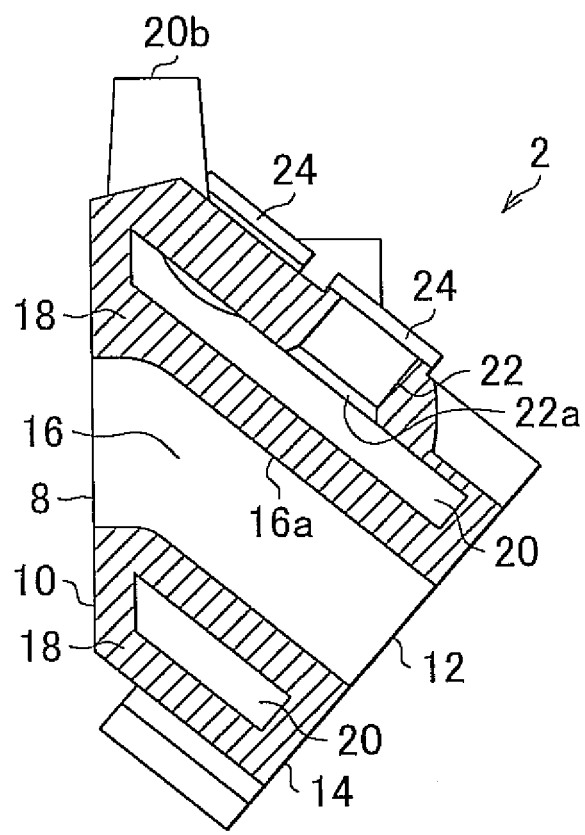
FIG. 9 is a cross-sectional view taken along line B-B of FIG. 2.
Figure 10:
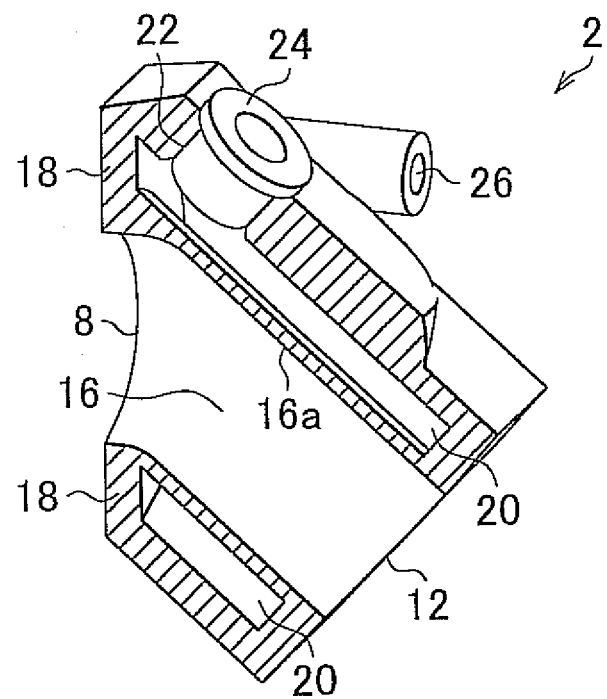
FIG. 10 is a perspective view with a cross-section taken along line C-C of FIG. 2.
Figure 11:
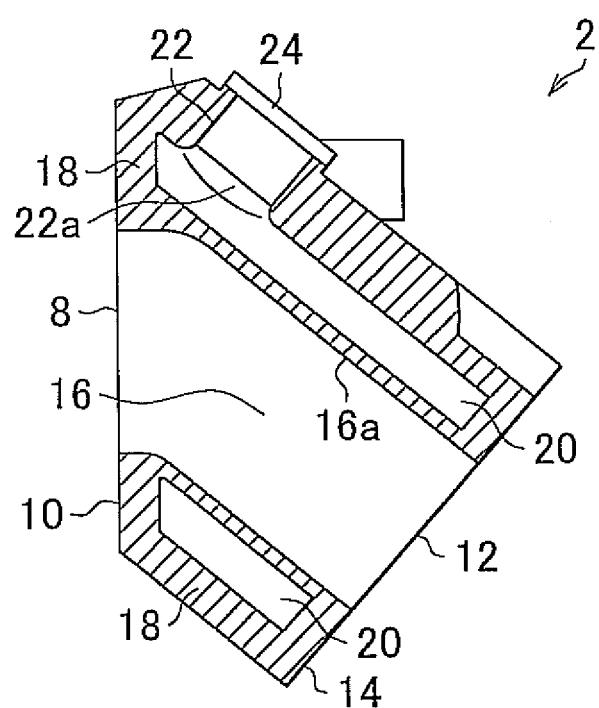
FIG. 11 is a cross-sectional view taken along line C-C of FIG. 2.

FIGS. 6 to 11 show sectional views of the cooling adaptor 2. FIG. 6 is a perspective view of the cooling adaptor 2 with a cross-section taken along line A-A of FIG. 2. FIG. 7 is a cross-sectional view taken along line A-A. FIG. 8 is a perspective view of the cooling adaptor 2 with a cross-section taken along line B-B of FIG. 2. FIG. 9 is a cross-sectional view taken along line B-B. FIG. 10 is a perspective view with a cross-section taken along line C-C of FIG. 2. FIG. 11 is a cross-sectional view taken along line C-C.

Figure 12:
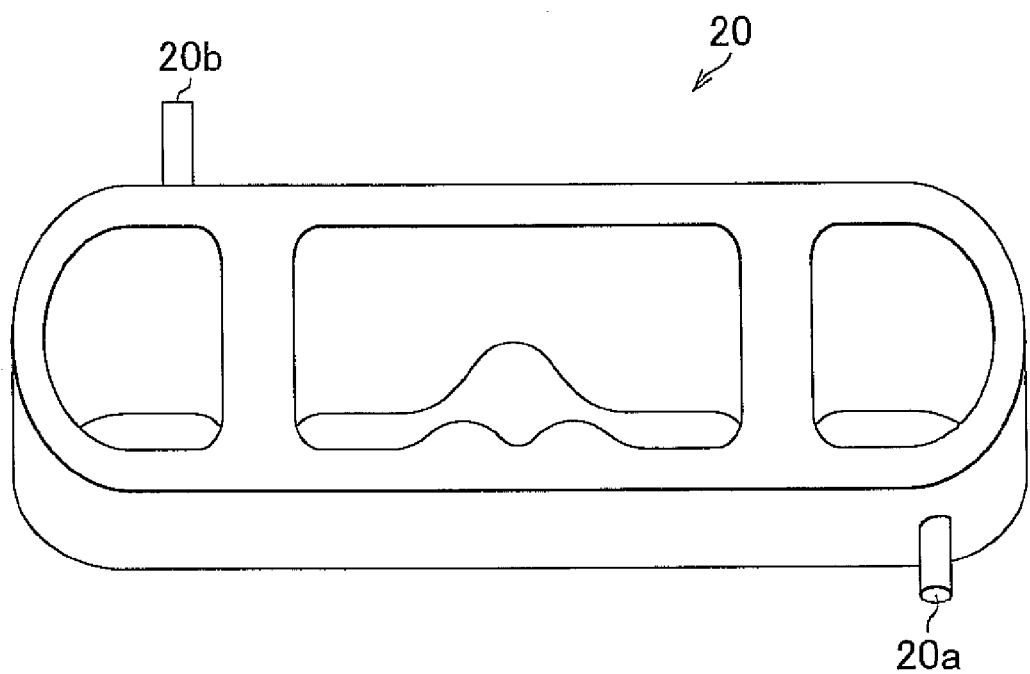
FIG. 12 is a front view of a spatial shape of a water jacket in the cooling adaptor in accordance with Embodiment 1 of the invention.
Figure 13:
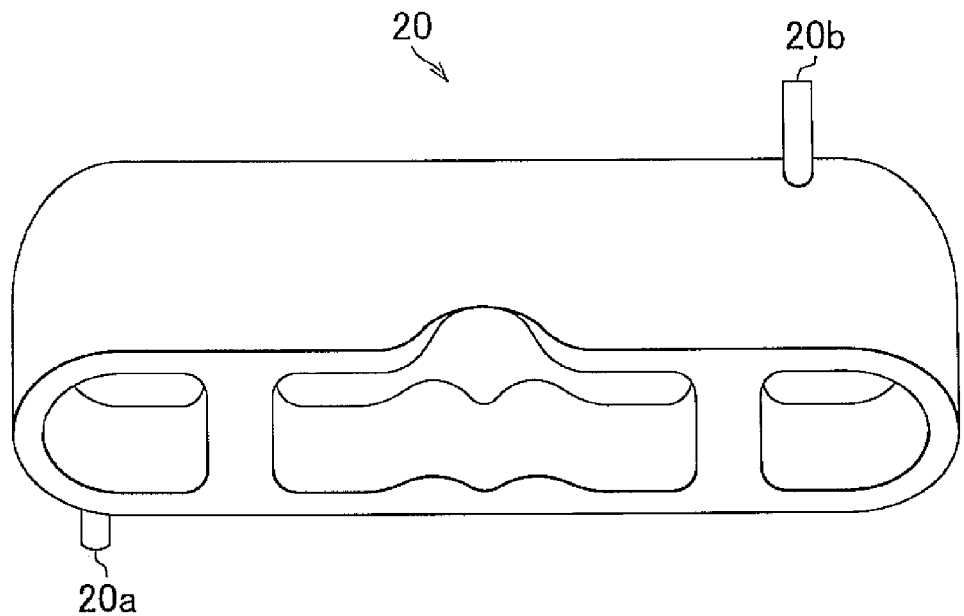
FIG. 13 is a back view of the spatial shape of the water jacket in the cooling adaptor in accordance with Embodiment 1 of the invention.
Figure 14:
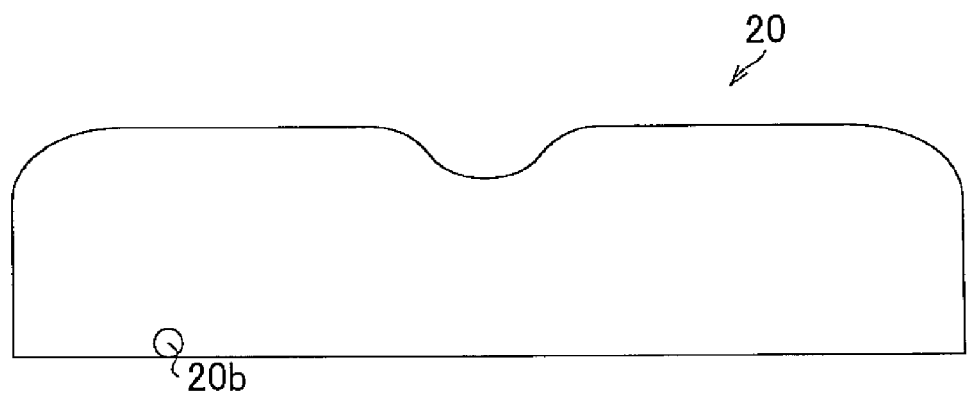
FIG. 14 is a plan view of the spatial shape of the water jacket in the cooling adaptor in accordance with Embodiment 1.
Figure 15:
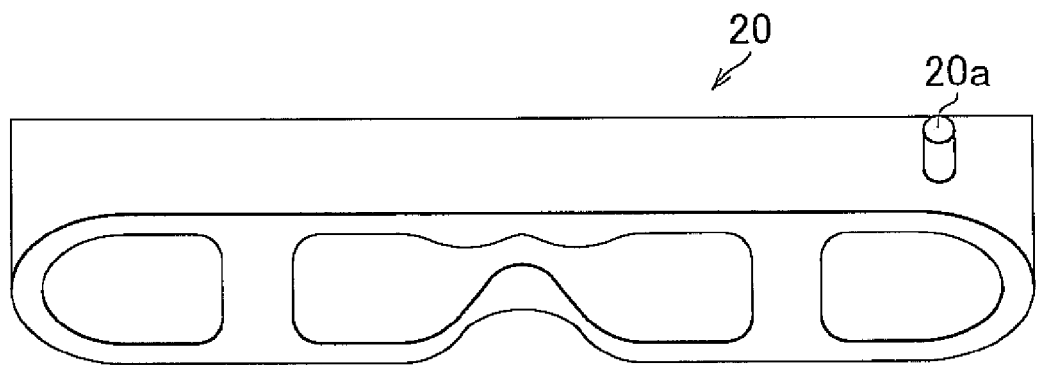
FIG. 15 is a bottom view of the spatial shape of the water jacket in the cooling adaptor in accordance with Embodiment 1.
Figure 16:
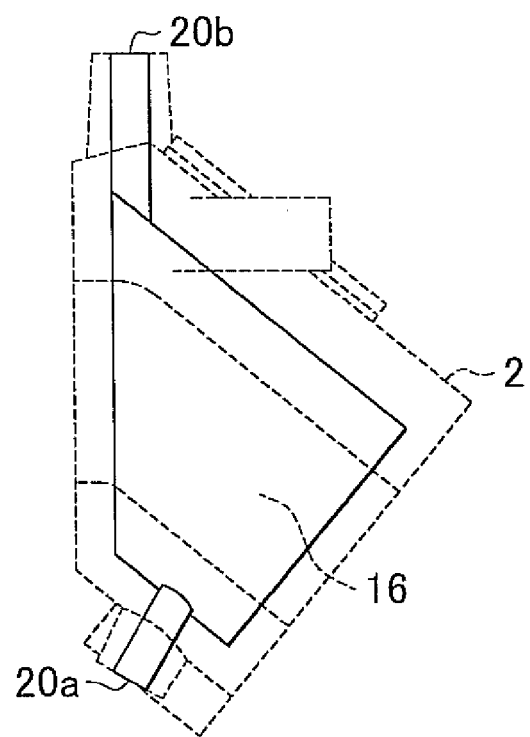
FIG. 16 is a right-hand side view of the spatial shape of the water jacket in the cooling adaptor in accordance with Embodiment 1.
Figure 17:
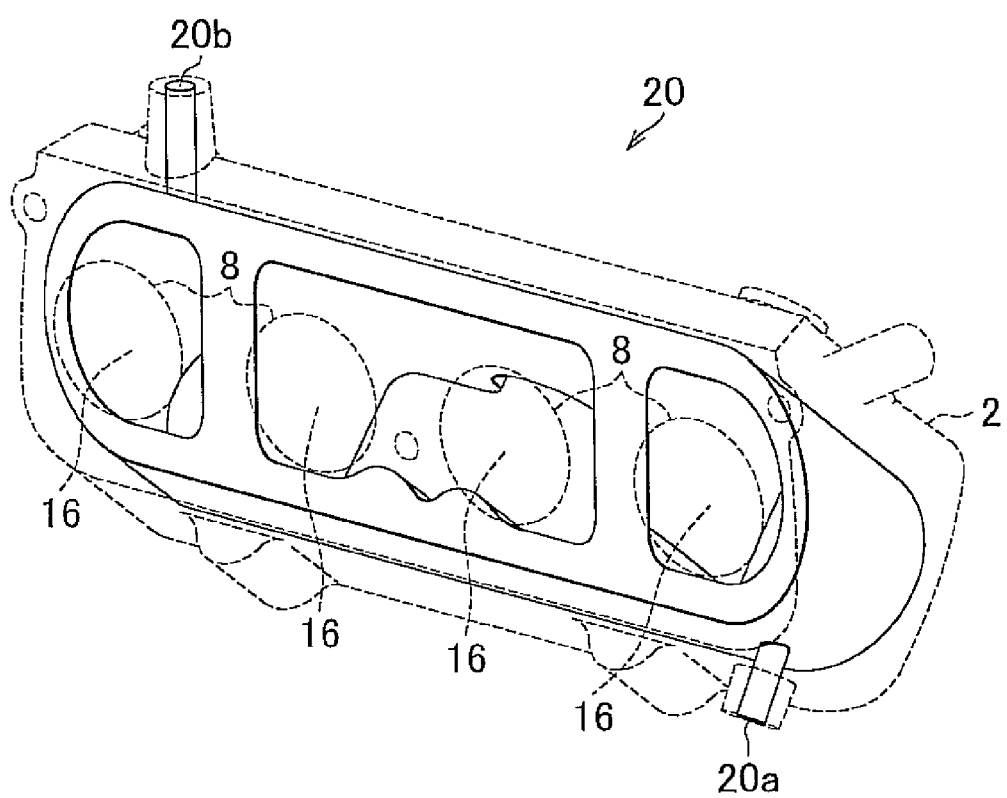
FIG. 17 is a perspective view of the spatial shape of the water jacket in the cooling adaptor in accordance with Embodiment 1 which is viewed from a right-hand side in the front view.
Figure 18:
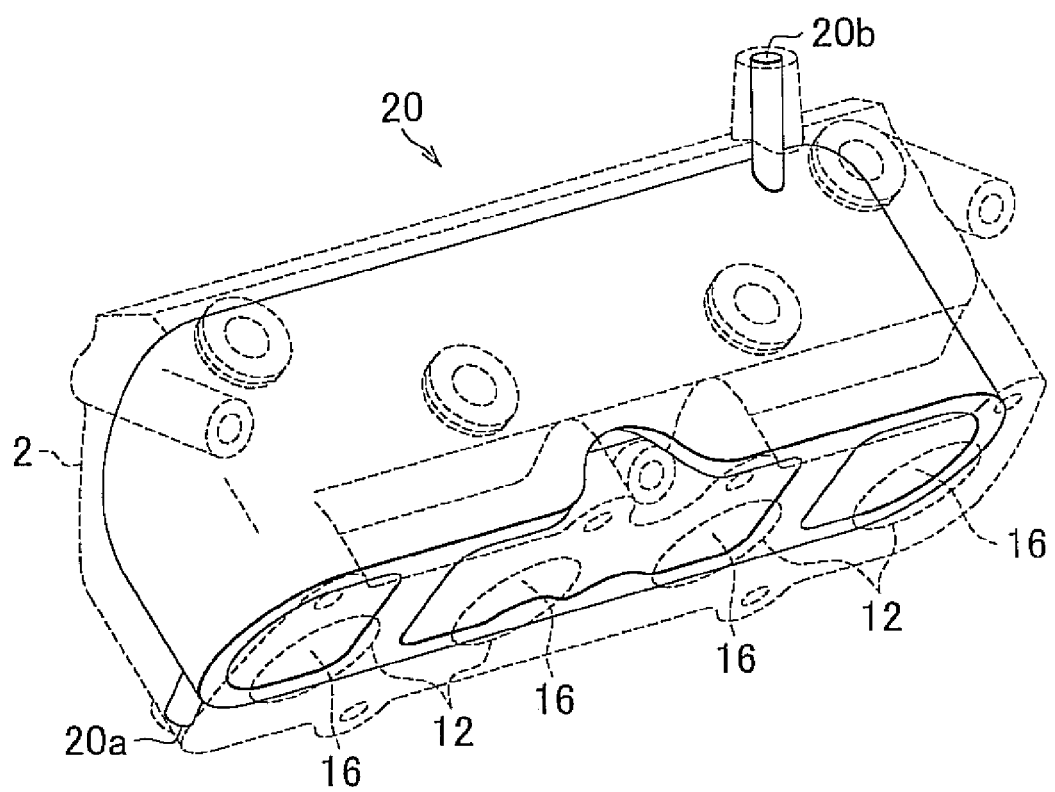
FIG. 18 is a perspective view the spatial shape of the water jacket in the cooling adaptor in accordance with Embodiment 1 which is viewed from a left-hand side in the back view.

As shown in these drawings, within a pipe wall 18 of the cooling adaptor 2, a water jacket 20 is provided as a cooling fluid passageway around the exhaust channels 16. FIGS. 12 to 18 show a spatial shape of the water jacket 20. FIG. 12 is a front view of the water jacket 20, FIG. 13 is a back view thereof, FIG. 14 is a plan view, FIG. 15 is a bottom view, FIG. 16 is a right-hand side view, FIG. 17 is a perspective view taken from a right-hand side in the front view, and FIG. 18 is a perspective view taken from a left-hand side in the back view. Incidentally, FIGS. 16 to 18 show an internal configuration of the cooling adaptor 2 (shown by interrupted lines).

When the cooling adaptor 2 as described above is mounted on the internal combustion engine, cooling water is introduced from a cooling water supply path of the engine into the water jacket 20 through a cooling water introduction opening 20a that is formed in a lower portion of the cooling adaptor 2, as shown by a two-dot-chain-line arrow in FIG. 5. Then, after flowing through the water jacket 20, the cooling water is discharged into a cooling water return path through a cooling water discharge opening 20b that is formed in an upper portion of the cooling adaptor 2, as shown by a two-dot-chain-line arrow in FIG. 5.

Since the water jacket 20 is formed around the exhaust channels 16, the exhaust gas that flows in the exhaust channels 16 as shown by interrupted-line arrows in FIG. 5 can be cooled via the pipe wall 18 of the cooling adaptor 2.

The exhaust introduction openings 8 connected to the exhaust ports 4a of the cylinder head 4 and the exhaust discharge openings 12 connected to the exhaust branch pipes 6 are formed so that center axes Ax of the exhaust introduction openings 8 and center axes Bx of the exhaust discharge openings 12 are shifted from each other, that is, placed out of alignment, as shown in FIG. 5. Due to an arrangement in which the center axes Ax and the center axes Bx are not parallel to each other, an out-of-alignment state of the center axes is realized.

Therefore, the exhaust channels 16 extend from the exhaust introduction openings 8, and immediately bend at a small distance within the pipe wall 18, and connect to the exhaust discharge openings 12. Due to this design, when the exhaust introduction openings 8 are connected to the exhaust ports 4a of the cylinder head 4, the exhaust discharge openings 12 are disposed with a vertically downward displacement from the exhaust introduction openings 8. In FIG. 5, the exhaust discharge openings 12 are disposed below the exhaust introduction openings 8 in the vertical direction.

Since an upper internal wall surface 16a of each exhaust channel 16 faces toward the exhaust introduction opening 8, the exhaust gas introduced into the cooling adaptor 2 through the exhaust ports 4a of the cylinder head 4 immediately collides with the upper internal wall surface 16a, so that the exhaust gas is thereby cooled, and the flowing direction is bent downward in the vertical direction and therefore the exhaust gas flows toward the exhaust discharge opening 12.

Incidentally, the cooling adaptor 2 is formed by casting as described above. The exhaust channels 16 and the water jacket 20 are formed by using cores. A core for the water jacket 20 has a spatial shape of the water 20 as shown in FIGS. 12 to 18. The core for the water jacket 20 is disposed in a mold together with cores for the exhaust channels 16, in order to cast the cooling adaptor 2. The core for the water jacket 20 is supported by pins in the mold. The pins are utilized to form extraction holes through which the core, after being destroyed following the casting process, is removed.

Therefore, after the core for the water jacket 20 is destroyed and discharged out through the extraction holes from which the pins have been removed, communication holes 22 that provide communication between the water jacket 20 and the outside remain as shown in FIGS. 8 to 11. Therefore, the communication holes 22 are each closed by a plug 24 as shown in drawings.

The water jacket 20 is formed so that the direction of the axis thereof obliquely extends along the exhaust channels 16, and opening portions of the communication holes 22 for the water jacket 20 are also in an oblique posture. In this embodiment, the communication holes 22 closed by the plugs 24 are provided above the water jacket 20 in the vertical direction, and the direction of the axes of the communication holes 22 is angled relative to the vertical direction.

Incidentally, in the cooling adaptor 2, through holes 26 are bolt insert holes for bolting the cooling adaptor 2 to the connecting surface of the cylinder head 4. Bolt fastening holes 28 that have openings in the exhaust branch pipe-side connecting surface 14 are holes for bolting the cooling adaptor 2 to the exhaust branch pipes 6 while the exhaust branch pipe-side connecting surface 14 and an upstream end of the exhaust branch pipes 6 are interconnected.

According to Embodiment 1 described above, the following effects are achieved. A first effect is as follows. Since the center axes Ax of the exhaust introduction openings 8 that are connected to the exhaust ports 4a of the cylinder head 4 and the center axes Bx of the exhaust discharge openings 12 that are connected to the exhaust branch pipes 6 are not parallel to each other, the cooling adaptor 2 has a construction in which the center axes Ax and the center axes Bx are placed out of alignment with each other.

Since the center axes Ax of the exhaust introduction openings 8 and the center axes Bx of the exhaust discharge openings 12 are placed out of alignment with each other, it is possible to achieve a layout in which the exhaust introduction openings 8 are disposed above the exhaust discharge openings 12 in the vertical direction as shown in FIG. 5. That is, the opening portions of the exhaust branch pipes 6 can be disposed below the opening portions of the exhaust ports 4a of the cylinder head 4 in the vertical direction.

Due to this, even if during a warm-up of the internal combustion engine, exhaust gas is cooled so that condensate water is formed in the exhaust channels 16 of the cooling adaptor 2, the condensate water can be discharged toward the exhaust branch pipe 6 side by the gravity, instead of toward the exhaust port 4a side of the cylinder head 4.

Furthermore, since the center axes Ax of the exhaust introduction openings 8 and the center axes Bx of the exhaust discharge openings 12 are placed out of alignment with each other, exhaust gas introduced through the exhaust introduction openings 8 collides with the pipe wall surfaces of the exhaust channels 16 because the direction of the flow of exhaust gas immediately after introduction through the exhaust introduction openings 8 is not parallel to the pipe wall surfaces of the exhaust channels 16. In FIG. 5, exhaust gas collides with the upper internal wall surfaces 16a of the exhaust channels 16. Therefore, the efficiency of heat exchange between exhaust gas and the pipe wall of the cooling adaptor 2 improves, so that the cooling efficiency can be enhanced.

Thus, the cooling adaptor 2 is able to enhance the cooling efficiency and prevent backflow of condensate water. Next, a second effect is as follows. That is, as shown in FIGS. 8 to 11, the water jacket 20 and the communication holes 22 that provide communication between the water jacket 20 and the outside for the purpose of discharging the core for the water jacket 20 are formed in the pipe wall 18 of the cooling adaptor 2.

Although the communication holes 22 are closed by the plugs 24, the plugs 24 does not completely fill the internal spaces of the communication holes 22, in fact, a communication hole 22 is sometimes left with a dent space 22a as shown in FIGS. 9 and 11.

The space 22a becomes an air pit when cooling water is introduced into the water jacket 20. Then, when the temperature of the cooling adaptor 2 becomes high due to exhaust gas, there is a possibility that the air remaining in the space 22a will serve as a starting point of the boiling of cooling water and therefore the heat exchange efficiency will decline.

In the cooling adaptor 2 of this embodiment, however, the communication holes 22 are provided so that the axis direction thereof is angled to the vertical direction as shown in FIGS. 9 and 11. Since the angled posture of the communication holes 22 facilitates removal of air despite the presence of the space 22a, the space 22a can be prevented from serving as an air pit.

Therefore, it is possible to prevent the boiling of cooling water promoted by residual air, and therefore prevent decline of the heat exchange efficiency, and maintain high cooling efficiency of the cooling adaptor 2. Next, a third effect is as follows. In the cooling adaptor 2, since the upper internal wall surface 16a of each exhaust channel 16 extends obliquely so as to face toward the exhaust introduction opening 8 side as shown in FIG. 5, the exhaust gas flow introduced through each exhaust introduction opening 8 firstly collides with the upper internal wall surface 16a, and then curves along the exhaust channel 16 and flows to the exhaust discharge opening 12 side.

At the upper internal wall surface 16a side, the water jacket 20 along the exhaust channels 16 is longer than at the opposite side (a lower internal wall surface side) of the exhaust channels 16 as shown in FIGS. 8 to 11. Because the water jacket 20 has a larger capacity at the upper internal wall surface 16a side than at other sites in the water jacket 20 as described above, the upper internal wall surface 16a side with which high-temperature exhaust gas flow first collides is provided with a higher capability of absorbing heat from exhaust gas than other sites. Therefore, exhaust gas can be effectively cooled, and the cooling efficiency can be enhanced.

Next, a fourth effect is as follows. In this embodiment, the cooling water introduced into the water jacket 20 is the cooling water for use for the internal combustion engine. Therefore, the cooling adaptor 2 can be efficiently cooled by using a common construction of the internal combustion engine cooling system.

Figure 19:
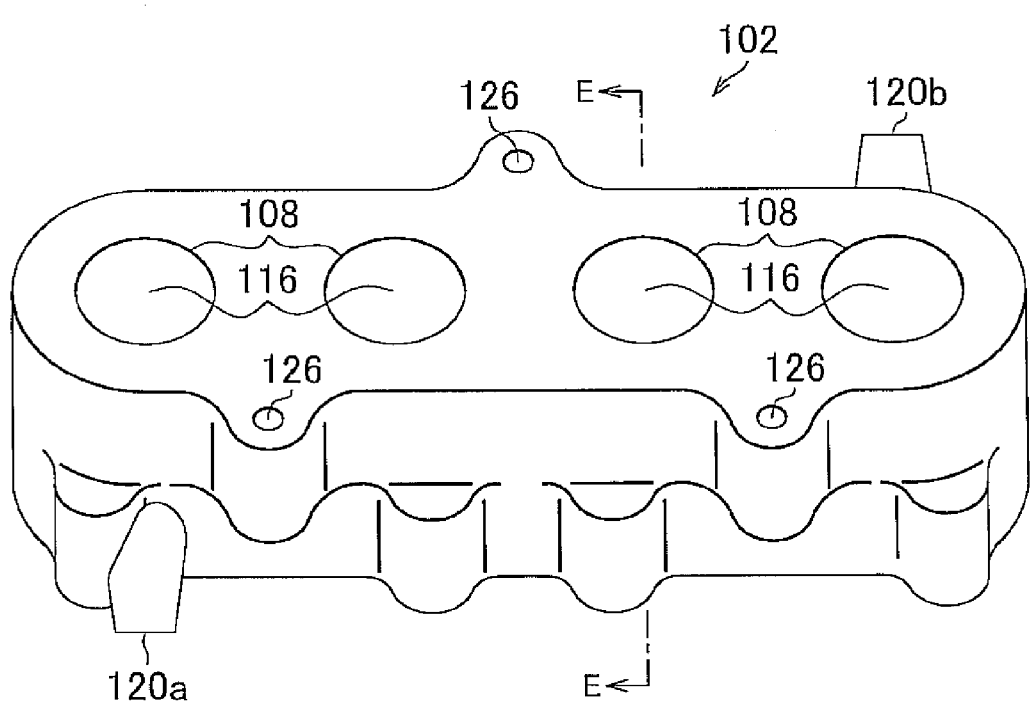
FIG. 19 is a front view of a cooling adaptor in accordance with Embodiment 2 of the invention.
Figure 20:
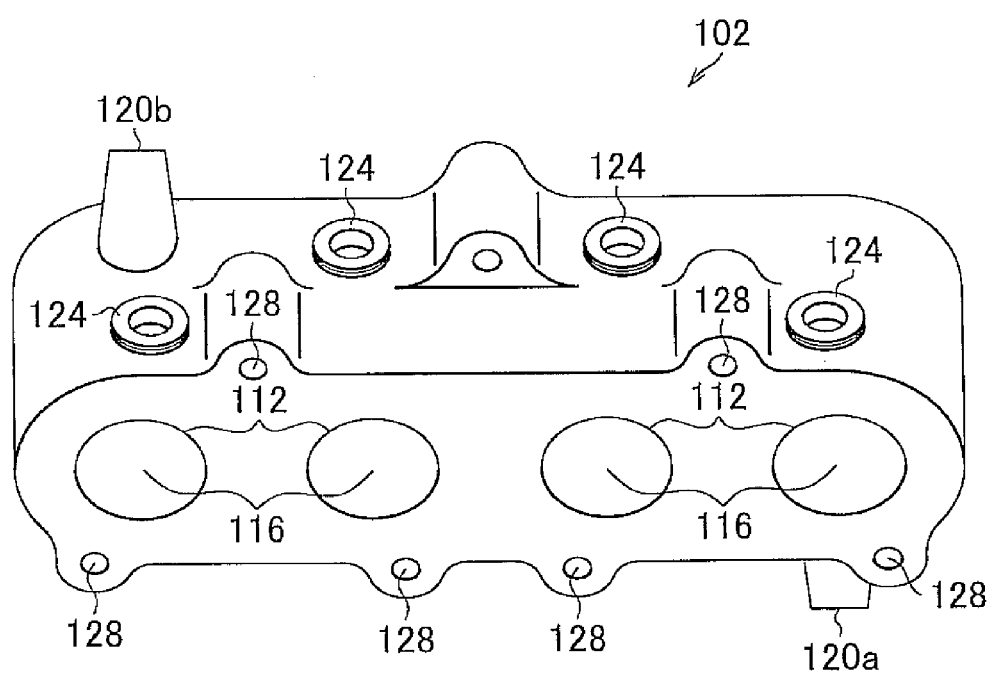
FIG. 20 is a back view of the cooling adaptor in accordance with Embodiment 2 of the invention.
Figure 21:
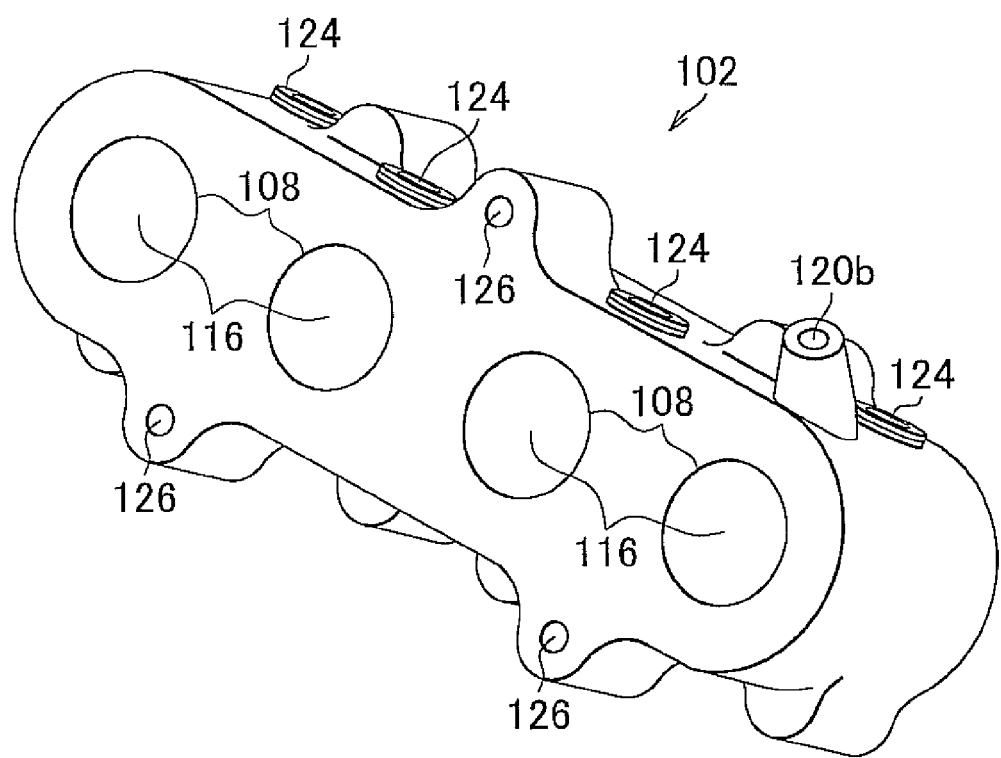
FIG. 21 is a perspective view of the cooling adaptor in accordance with Embodiment 2 which is viewed from a right-hand side in the front view.
Figure 22:
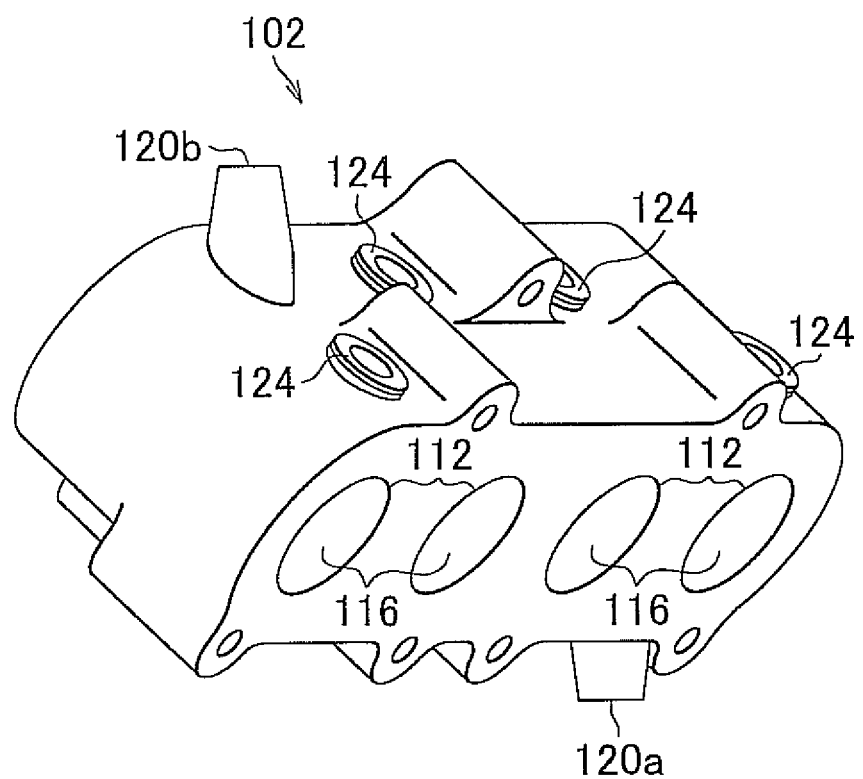
FIG. 22 is a perspective view of the cooling adaptor in accordance with Embodiment 2 which is viewed from a left-hand side in the back view.

A construction of a cooling adaptor 102 for use in an internal combustion engine exhaust system in accordance with Embodiment 2 of the invention is shown in FIGS. 19 to 25. FIG. 19 is a front view of the cooling adaptor 102, FIG. 20 is a back view thereof, FIG. 21 is a perspective view taken from a right-hand side in the front view, FIG. 22 is a perspective view taken from a left-hand side in the back view, and FIG. 23 is a right-hand side view. Incidentally, in FIG. 23, a cylinder head 104 and exhaust branch pipes 106 of an internal combustion engine with which the cooling adaptor 102 is combined are shown by interrupted lines.

The cooling adaptor 102, as shown in FIG. 23, is provided between the exhaust branch pipes 106 and exhaust ports 104a that have openings in the cylinder head 104 of the internal combustion engine, so that the cooling adaptor 102 cools exhaust gas discharged from the engine through opening portions 104c of the exhaust ports 104a, and discharges the exhaust gas to opening portions 106a of the exhaust branch pipes 106. In this manner, the cooling adaptor 102 prevents the adverse heat effect in the exhaust system. In this respect, Embodiment 2 is the same as Embodiment 1 described above.

In the cylinder head 104 in this embodiment, a cooling adaptor-connecting surface 104b provided with the opening portions 104c of the exhaust ports 104a is inclined so as to face obliquely downward in the vertical direction. In this cooling adaptor 102, a cylinder head-side connecting surface 110 in which exhaust introduction openings 108 are formed and an exhaust branch pipe-side connecting surface 114 in which exhaust discharge openings 112 are formed are parallel to each other, and center axes of the exhaust introduction openings 108 and center axes of the exhaust discharge openings 112 coincide with each other, that is, are aligned with each other.

Therefore, exhaust channels 116 formed in the cooling adaptor 102 are linear and not bent. However, because the cooling adaptor 102 is connected to the cooling adaptor-connecting surface 104b that is inclined so as to face obliquely downward in the vertical direction when an internal combustion engine exhaust system is constructed, the entire exhaust channels 116 within the cooling adaptor 102 are inclined so that the exhaust discharge opening 112 side thereof faces obliquely downward in the vertical direction.

Figure 24:
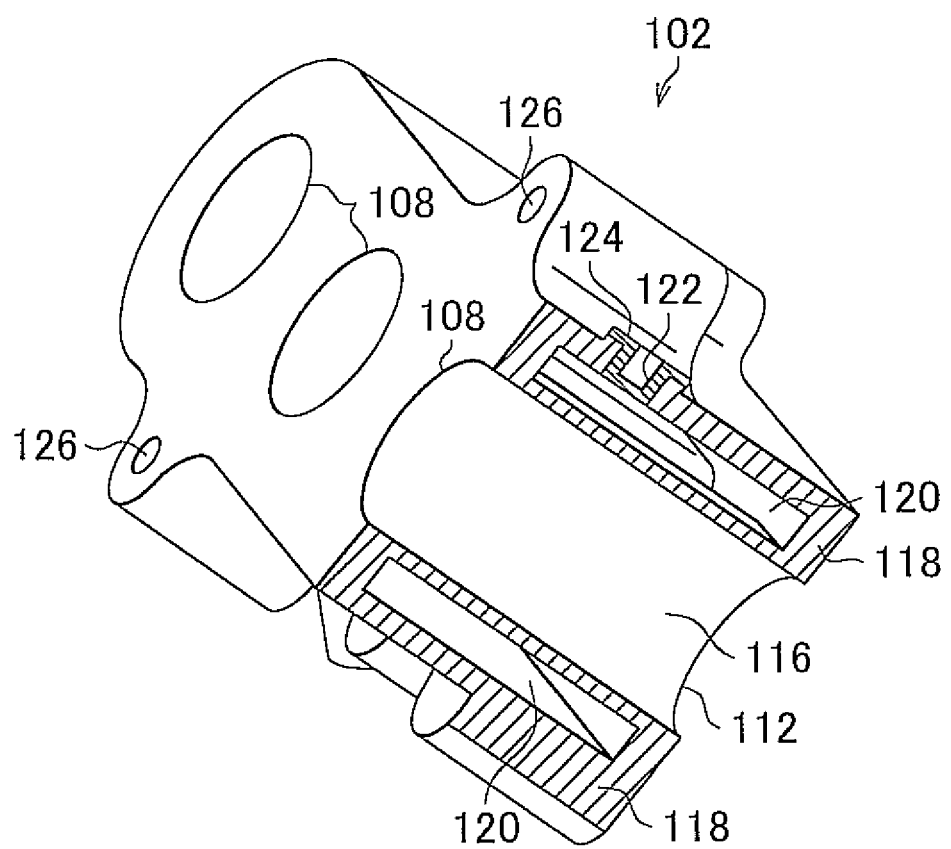
FIG. 24 is a perspective view of the cooling adaptor with a cross-section taken along line E-E of FIG. 19.
Figure 25:
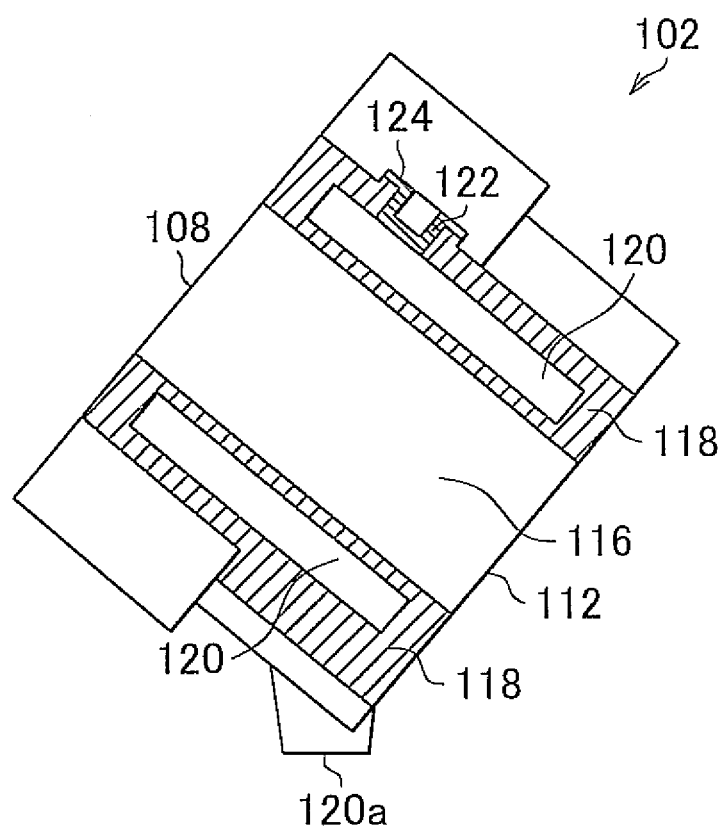
FIG. 25 is a cross-sectional view of the cooling adaptor taken along line E-E of FIG. 19.

FIGS. 24 and 25 show a cross-section of the cooling adaptor 102. FIG. 24 is a perspective view of the cooling adaptor 102 with a cross-section taken along line E-E of FIG. 19, and FIG. 25 is a cross-sectional view taken along line E-E. As shown in the drawings, within a pipe wall 118 of the cooling adaptor 102, a water jacket 120 is provided as a cooling fluid passageway around the exhaust channels 116.

Figure 26:
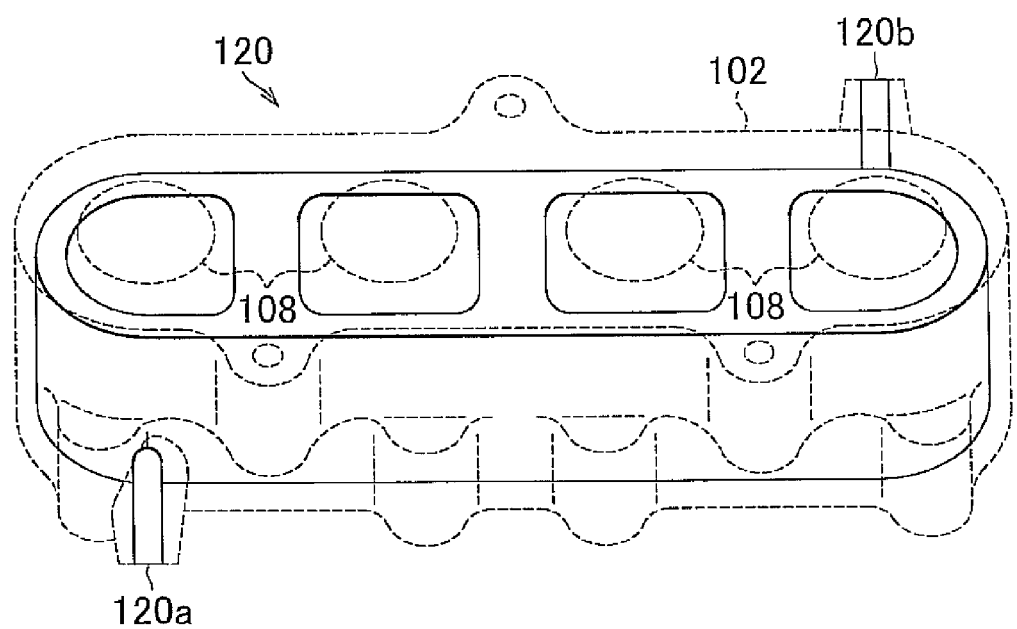
FIG. 26 is a front view of a spatial shape of a water jacket of the cooling adaptor in accordance with Embodiment 2.
Figure 27:
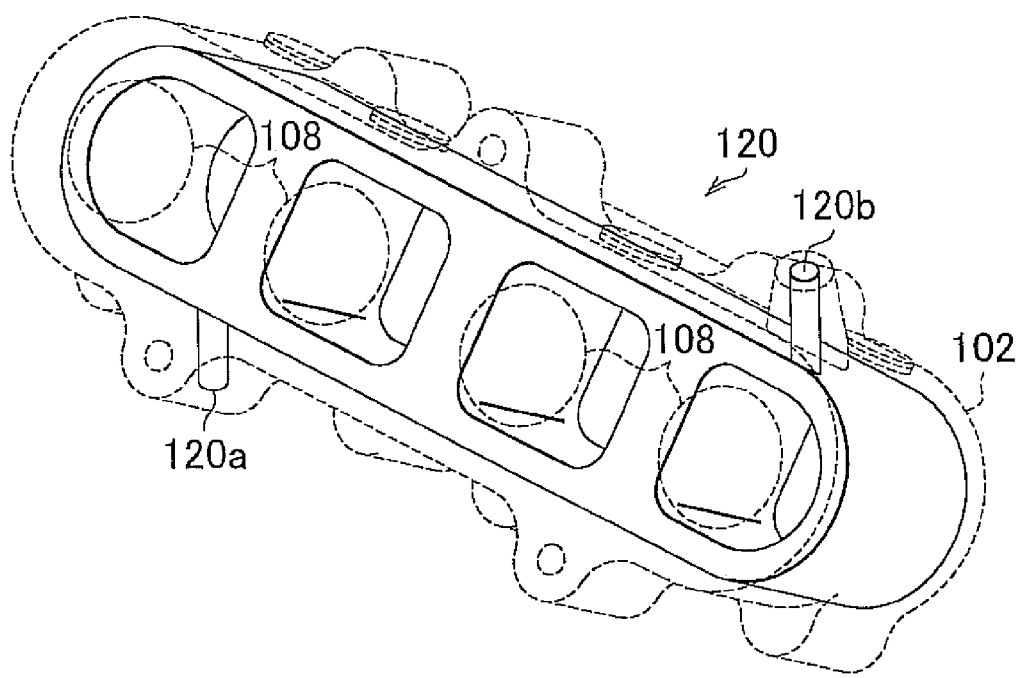
FIG. 27 is a perspective view of the spatial shape of the water jacket of the cooling adaptor in accordance with Embodiment 2 which is viewed from a right-hand side in the front view.

FIGS. 26 and 27 show a spatial shape of the water jacket 120. FIG. 26 is a front view of the water jacket 120, and FIG. 27 is a perspective view thereof taken from a right-hand side in the front view. Incidentally, FIGS. 26 and 27 show an internal configuration of the cooling adaptor 102 (shown by interrupted lines).

When the cooling adaptor 102 is mounted on the internal combustion engine, cooling water is introduced into the water jacket 120 from a cooling water supply path of the internal combustion engine through a cooling water introduction opening 120a that is formed in a lower portion of the cooling adaptor 102 in the vertical direction. Then, after flowing through the water jacket 120, the cooling water is discharged into a cooling water return path through a cooling water discharge opening 120b that is formed in an upper portion of the cooling adaptor 102 in the vertical direction.

Since the water jacket 120 is formed around the exhaust channels 116, the exhaust gas that flows in the exhaust channels 116 is cooled via the pipe wall 118 of the cooling adaptor 102. Incidentally, in the cooling adaptor 102 in this embodiment, a peripheral portion of the cooling adaptor 102 is provided with bolt insert holes 126 for bolting the cooling adaptor 102 to the cooling adaptor-connecting surface 104b of the cylinder head 104 and bolt fastening holes 128 for connecting and bolting an upstream end of the exhaust branch pipes 106 to the exhaust branch pipe-side connecting surface 114. Neither a bolt insert hole 126 nor a bolt fastening holes 128 is provided in a central portion of the cooling adaptor 102. Therefore, the water jacket 120 is formed between cylinders in a central portion as well.

In the internal combustion engine exhaust system of this embodiment, the exhaust gas introduced into the cooling adaptor 102 from the exhaust ports 104a of the cylinder head 104 immediately moves through the exhaust channels 116 toward the exhaust discharge openings 112 that are provided at a lower location in the vertical direction, without bending its flowing direction.

As for the cooling adaptor 102, as described above in conjunction with Embodiment 1, communication holes 122 that are holes through which cores for the water jacket 120 are removed are left open after the casting process. Therefore, the communication holes 122 are closed with plugs 124 as shown in FIGS. 24 and 25. The direction of the axis of the water jacket 120 is oblique along the exhaust channels 116, and the opening portions of the communication holes 122 for the water jacket 120 are also in an oblique posture. In this construction, the communication holes 122 closed with the plugs 124 are provided in upper portions of the water jacket 120 in the vertical direction, and the axis direction of the communication holes 122 is angled relative to the vertical direction.

According to Embodiment 2 described above, the following effects are achieved. A first effect is as follows. In the internal combustion engine exhaust system in accordance with this embodiment, the opening portions 104c of the exhaust ports 104a of the cylinder head 104 and the opening portions 106a of the exhaust branch pipes 106 which are interconnected by the cooling adaptor 102 are disposed so that the opening portions 106a of the exhaust branch pipes 106 are below, in the vertical direction, the opening portions 104c of the exhaust ports 104a.

Due to this arrangement, although the exhaust channels 116 of the cooling adaptor 102 are not bent but linear, the exhaust channels 116 as a whole are inclined so as to face obliquely downward in the vertical direction.

Due to this, even if condensate water is formed within the cooling adaptor 102, the condensate water flows toward the exhaust branch pipe 106 side, instead of toward the exhaust port 104a side of the internal combustion engine, so that backflow of condensate water can be prevented.

Next, as a second effect, the second and fourth effects of Embodiment 1 can be achieved.

Figure 28:
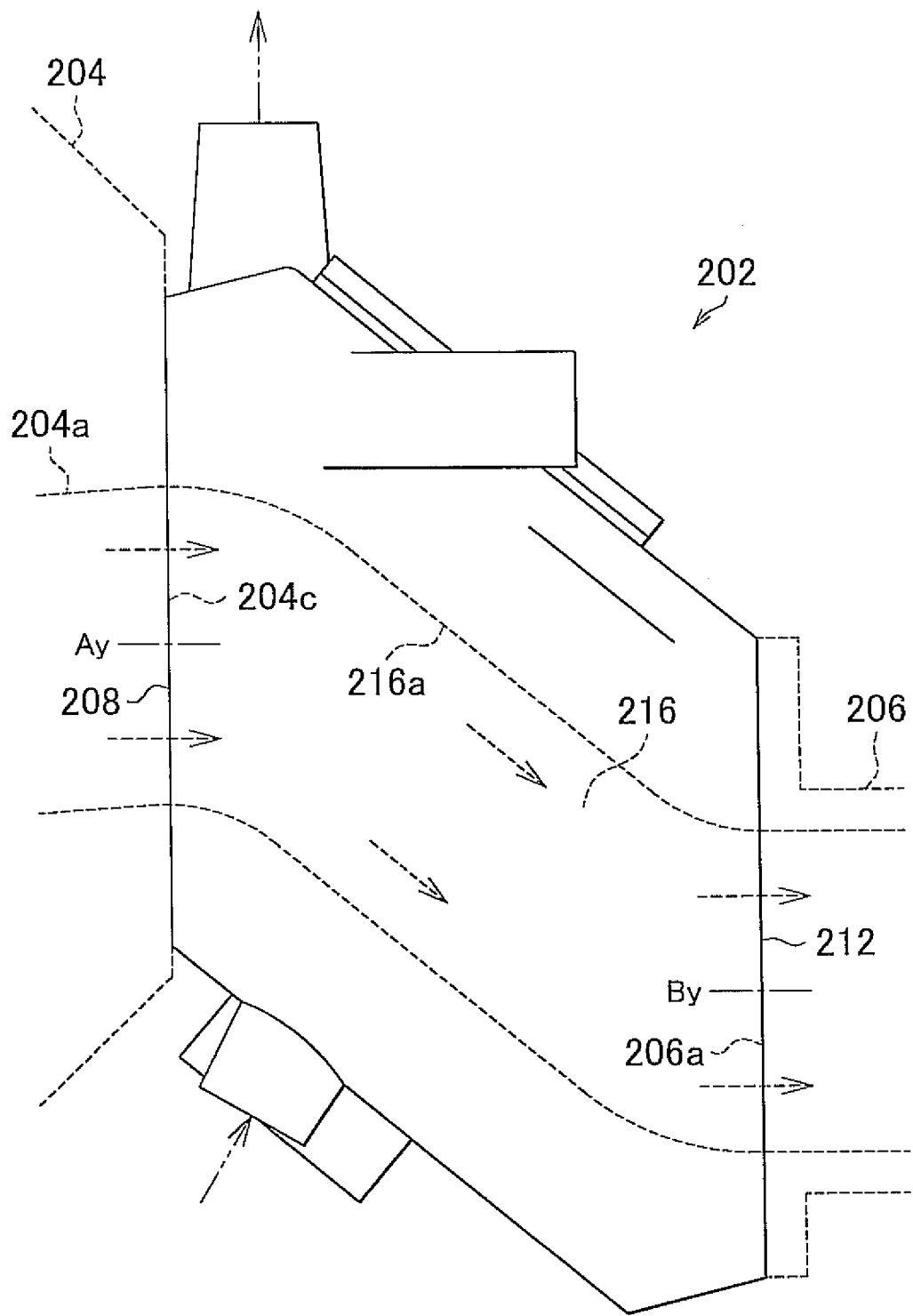
FIG. 28 is a right-hand side view of a cooling adaptor in accordance with Embodiment 3 the invention.

In a cooling adaptor 202 in accordance with Embodiment 3 of the invention, as shown in a right-hand side view in FIG. 28, center axes Ay of the exhaust introduction openings 208 and center axes By of the exhaust discharge openings 212 are parallel to each other, but not aligned with each other. That is, a distance is provided between the axes Ay and the axes By, whereby the central axes Ay of the exhaust introduction openings 208 connected to exhaust ports 204a of a cylinder head 204 and the central axes By of the exhaust discharge openings 212 connected to exhaust branch pipes 206 are placed out of alignment with each other.

Therefore, when the cooling adaptor 202 is mounted on the cylinder head 204 of an internal combustion engine, exhaust channels 216 formed within the cooling adaptor 202 can be inclined obliquely downward in the vertical direction. Therefore, an internal combustion engine exhaust system can be constructed with an arrangement in which opening portions 204c of the exhaust ports 204a of the cylinder head 204 and opening portions 206a of the exhaust branch pipes 206 are parallel to each other, but are placed out of alignment with each other so that the opening portions 206a of the exhaust branch pipes 206 are below, in the vertical direction, the opening portions 204c of the exhaust ports 204a.

In this embodiment, too, an upper internal wall surface 216a of each of exhaust channels 216 is inclined so as to face toward the exhaust introduction opening 208 side. Therefore, the exhaust gas flow introduced into the exhaust channels 216 from the exhaust introduction openings 208 firstly collides with the upper internal wall surfaces 216a, and then moves along the exhaust channels 216 to the exhaust discharge opening 212 side.

Other constructions of Embodiment 3 are the same as those of Embodiment 1. Embodiment 3 described above achieves the first, second and fourth effects of Embodiment 1 although Embodiment 3 is different from Embodiment 1 in that in Embodiment 3 the center axes Ay and the center axes By are parallel.

Figure 29:
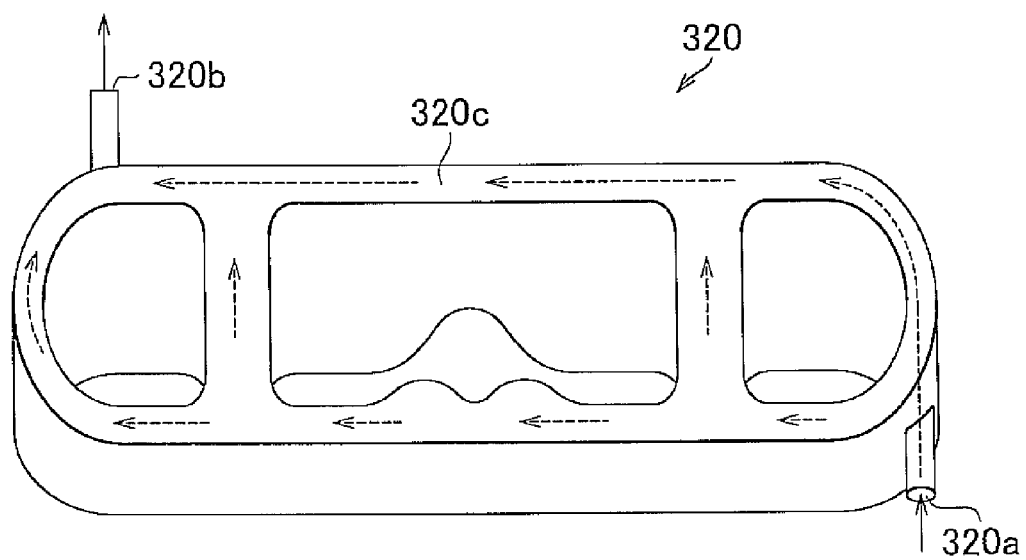
FIG. 29 is a front view of an example of the spatial shape of a water jacket of a cooling adaptor in accordance with Embodiment 4 of the invention.

In each of water jackets 320 and 420 of cooling adaptors in accordance with Embodiment 4 of the invention as shown in FIGS. 29 and 30, respectively, the arrangement and direction of a cooling water introduction opening 320a or 420a are set so that cooling water from the cooling water introduction opening 320a or 420a is jetted particularly toward an upper-side channel 320c or 420c.

Incidentally, the water jacket 320 shown in FIG. 29 is applicable to the cooling adaptor 2 of Embodiment 1, and the water jacket 420 shown in FIG. 30 is applicable to the cooling adaptor 202 of Embodiment 3.

Therefore, in the upper-side channel 320c and 420c, the flow speed of cooling water is faster than in the channels in the other portions of the water jacket 320 and 420, so that the upper-side channel 320c and 420c has higher capability of cooling than the other channels.

According to Embodiment 4 described above, due to the provision of a difference between the flow speed of cooling water in the channel 320c and 420c that is formed at the side of the upper internal wall surfaces 16a and 216a that face toward the exhaust introduction opening 8 and 208 (in FIGS. 5 and 28) side and the flow speed in channels in other portions, the heat absorption capability is made higher at the upper internal wall surfaces 16a and 216a than at other portions. Therefore, exhaust gas can be effectively cooled by cooling water, so that the cooling efficiency can be enhanced.

Incidentally, in the casting process of the cooling adaptor 2 of Embodiment 1, cores for the exhaust channels 16 are disposed at an inner side of a core for the water jacket 20 within a mold.

Figure 31A:
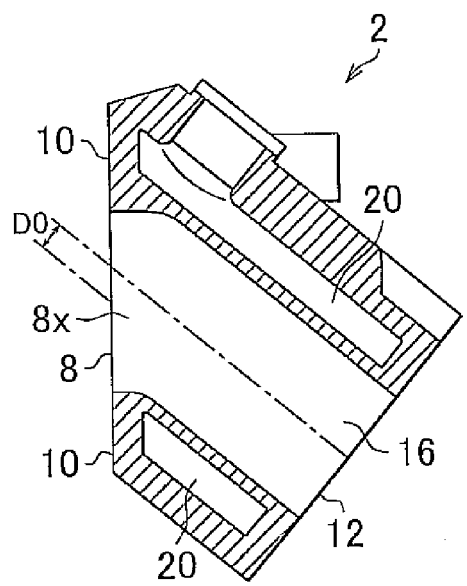
FIG. 31A to FIG. 31C are sectional views of various forms of exhaust channels.

An exhaust introduction opening 8-side portion of each of the cores for the exhaust channels 16 is bent at a small distance (a region 8x) from the exhaust introduction opening 8-side end so that the exhaust introduction opening 8-side portion is orthogonal to the cylinder head-side connecting surface 10 as shown in FIG. 31A, in order to secure a high profile of the exhaust introduction openings 8. Therefore, the distance D0 between the center axis of each exhaust channel 16 at the exhaust discharge opening 12 side and the center (profile center) of a corresponding one of the exhaust introduction openings 8 is restrained to a short distance.

Figure 31B:
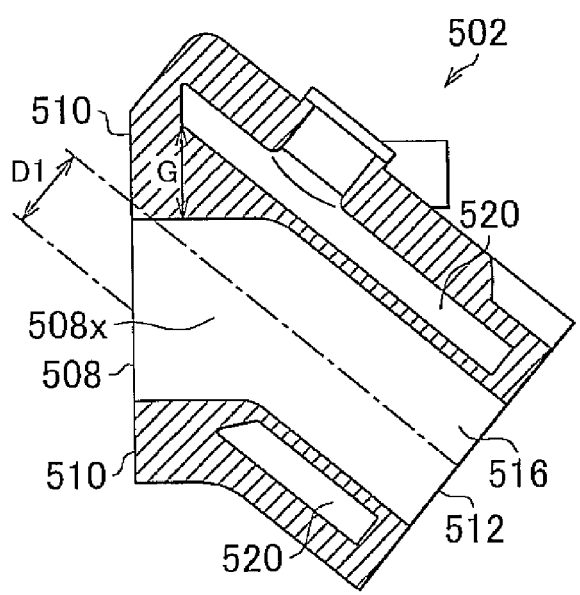

In this embodiment, it is also possible to increase the length of an exhaust introduction opening 508-side portion of each exhaust channel 516 that is orthogonal to the cylinder head-side connecting surface 510 (a region 508x). However, if the region 508x is long as in the construction shown in FIG. 31B, the distance D1 between the center axis of the exhaust discharge openings 512-side portion of each exhaust channel 516 and the center of a corresponding one of the exhaust introduction openings 508 is considerably large. In the case where the distance D1 is considerably large, there is a possibility that the region 508x at the exhaust introduction opening 508 side may be considerably apart from the water jacket 520 as shown by a gap G and therefore the improvement of the cooling efficiency may be restrained.

This is because it is difficult to bend the core for the water jacket 520 similarly to the cores for the exhaust channels 516 due to the need to insert the cores for the exhaust channels 516 into the core for the water jacket 520.

Figure 31C:
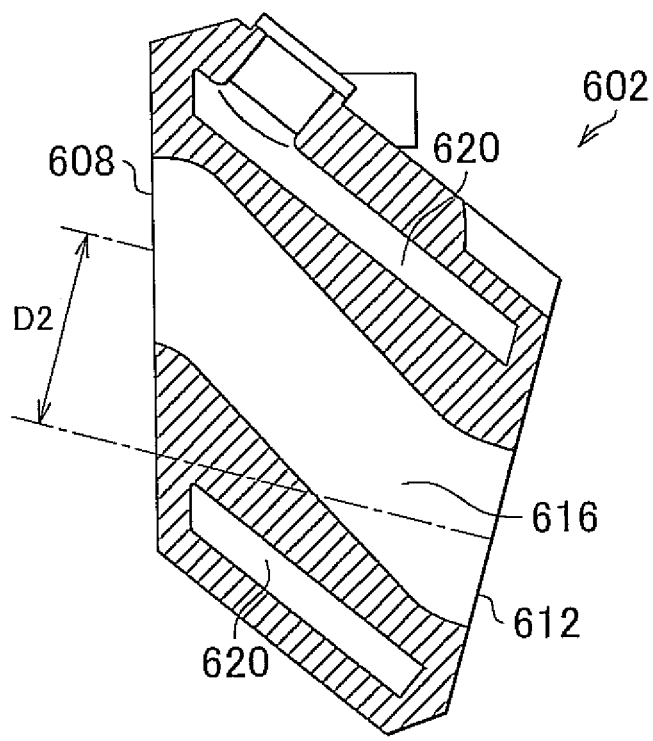

Therefore, it is preferable that the distance D1 between the exhaust discharge opening 512-side center axis of each exhaust channel 516 and the center of a corresponding one of the exhaust introduction openings 508 be made as small as possible. In this embodiment, it is also possible to adopt a construction in which each of exhaust channels 616 is bent at two sites as in a cooling adaptor 602 shown in FIG. 31C. However, in this case, too, if the distance D2 between the center axis of an exhaust discharge opening 612-side portion of each exhaust channel 616 and the center of a corresponding one of exhaust introduction openings 608 is large as shown in FIG. 31C, there is a possibility that due to the foregoing constraint in arrangement, the exhaust channels 616 may become greatly apart from the water jacket 620 both at the upper and lower sides in the vertical direction and therefore the improvement of the cooling efficiency may be restrained. Therefore, in this case, too, it is also preferable that the distance D2 between the exhaust discharge opening 612-side center axis of each exhaust channel 616 and the center of a corresponding one of the exhaust introduction openings 608 be made as small as possible.

In each of the foregoing embodiments, it is also possible to adopt a construction in which reduced-temperature cooling water is introduced into the water jacket of the cooling adaptor from a radiator separately from the internal combustion engine. Alternatively, it is also permissible to adopt a construction in which a portion of the cooling water that cools the cylinder head or the cylinder block of the internal combustion engine is introduced from the cylinder head of the cylinder block into the water jacket and, after flowing through the water jacket, the cooling water is returned to a circulation path.

In Embodiment 2, the cooling adaptor-connecting surface 104b in which the exhaust ports 104a have openings is inclined so as to face obliquely downward in the vertical direction. This inclined arrangement can also be achieved by inclining the internal combustion engine itself instead of inclining only the cooling adaptor-connecting surface 104b.

Although in Embodiment 4 described above, the cooling capability is enhanced by causing the flow speed of the cooling water in the upper-side channel 320c and 420c to be higher than the flow speeds in the other portions, the cooling capability may also be enhanced by making the capacity of the upper-side channel 320c and 420c larger than the capacities of other portions. For example, the thickness of the upper-side channel 320c and 420c may be made greater than the thicknesses of other portions so that a larger volume of the cooling water flows in the upper-side channel 320c and 420c than in the other portions.

Figure 32:
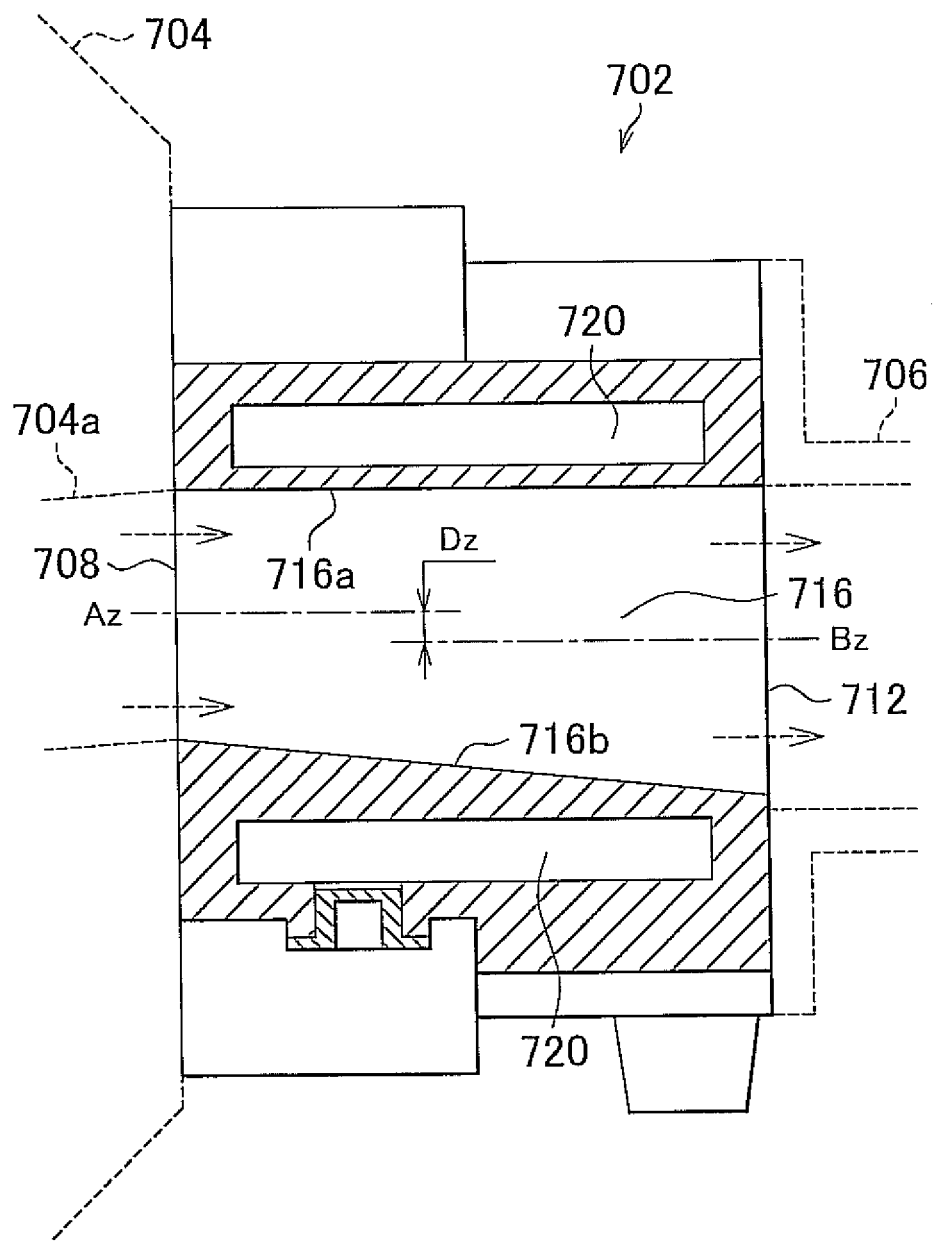
FIG. 32 is a sectional view of a cooling adaptor in accordance with another embodiment of the invention.

As for the manner in which the center axes of the exhaust introduction openings that are connected to the exhaust ports and the center axes of the exhaust discharge openings that are connected to the exhaust branch pipes are placed out of alignment with each other so that the center axes at the two sides are parallel to each other, it is also possible to place the center axes out of alignment with each other as in a cooling adaptor 702 shown in the right-side view in FIG. 32, instead of placing the center axes out of alignment with each other in the manner employed in Embodiment 3 (FIG. 28).

In the cooling adaptor 702, the center axis Az of each of the exhaust introduction openings 708 is parallel to the center axis Bz of a corresponding one of the exhaust discharge openings 712, but the two center axes Az and Bz are not aligned with each other. That is, an upper internal wall surface 716a of each exhaust channels 716 is horizontal, while a lower internal wall surface 716b thereof is inclined downward in the vertical direction, toward the exhaust discharge opening 712 side. As a result, a distance Dz is provided between the two center axes Az and Bz, and the center axis Bz of each exhaust discharge opening 712 is shifted downward in the vertical direction from the center axis Az of a corresponding one of the exhaust introduction openings 708. Incidentally, a water jacket 720 in this construction has a shape as shown in FIGS. 26 and 27 or FIG. 30.

In the case where the cooling adaptor 702 is applied to an internal combustion engine as shown in the drawings, condensate water formed within any one of the exhaust channels 716 flows down from the upper internal wall surface 716a to the lower internal wall surface 716b by gravity, and then flows along the lower internal wall surface 716b to the exhaust branch pipe 706 side. Thus, condensate water is prevented from flowing back to the exhaust port 704a side of the cylinder head 704.

In the foregoing embodiments, the exhaust gas-cooling pipe element is to be provided between exhaust ports of an internal combustion engine and exhaust branch pipes thereof. In the exhaust gas-cooling pipe element, the center axis of each of exhaust introduction openings that are connected to the exhaust ports and the center axis of a corresponding one of exhaust discharge openings that are connected to the exhaust branch pipes are placed out of alignment with each other.

In the case where the exhaust discharge direction of the exhaust ports of an internal combustion engine is horizontal or slightly upward, the exhaust discharge openings of a common exhaust gas-cooling pipe element are at the same level as or higher than the exhaust introduction openings thereof. However, in a construction as in Embodiment 1 in which the center axis of each exhaust introduction opening and the center axis of a corresponding one of the exhaust discharge openings are placed out of alignment, the exhaust discharge openings can be placed below the exhaust introduction openings in the vertical direction.

Therefore, in an internal combustion engine, the openings of the exhaust branch pipes can be disposed below the openings of the exhaust ports, in the vertical direction. Therefore, even if condensate water is formed within the exhaust gas-cooling pipe element, the condensate water can be caused to flow to the exhaust branch pipes side, not to the internal combustion engine side, by gravity.

Furthermore, since the center axis of each of the exhaust introduction openings and the center axis of a corresponding one of the exhaust discharge openings are placed out of alignment, the flowing direction of the exhaust gas that has flown into the exhaust introduction openings from the exhaust ports is not parallel to the wall surfaces of the exhaust channels of the exhaust gas-cooling pipe element, but is a direction such that the exhaust gas collides with the wall surfaces, that is, collides with the pipe wall of the exhaust gas-cooling pipe element. Therefore, the efficiency of the heat exchange between exhaust gas and the pipe wall of the exhaust gas-cooling pipe element improves, so that the cooling efficiency can be enhanced.

Therefore, the exhaust gas-cooling pipe element in accordance with any one of the foregoing embodiments can enhance the cooling efficiency and can prevent the backflow of condensate water.

Besides, in the foregoing embodiment, in the exhaust gas-cooling pipe element, the center axes of the exhaust introduction openings and the center axes of the exhaust discharge openings are not parallel to each other.

The center axes may be placed out of alignment with each other also by making the center axes non-parallel to each other. In this case, too, the cooling efficiency can be enhanced and the backflow of condensate water can be prevented as described above.

Besides, in some of the embodiments, in the exhaust gas-cooling pipe element, the center axis of each exhaust introduction opening and the center axis of a corresponding one of the exhaust discharge openings are made parallel to each other, and a certain distance is provided between the center axis of each exhaust introduction opening and the center axis of a corresponding one of the exhaust discharge openings.

Thus, each exhaust introduction opening and a corresponding one of the exhaust discharge openings may be placed out of alignment with each other by making their center axes parallel to each other and providing a distance between the center axes. This arrangement, too, can enhance the cooling efficiency and prevent the backflow of condensate water.

Besides, as for the exhaust gas-cooling pipe elements of the foregoing embodiments, when the exhaust introduction openings are connected to the exhaust ports of the internal combustion engine, the exhaust discharge openings are disposed below the exhaust introduction openings in the vertical direction.

Due to the foregoing setting of the relation in the position in the vertical direction between the exhaust introduction openings and the exhaust discharge openings of the exhaust gas-cooling pipe element, it is possible to both enhance the efficiency of cooling exhaust gas from an internal combustion engine and prevent the backflow of condensate water.

Besides, in the foregoing embodiments, the cooling fluid passageway is formed within the pipe wall of the exhaust gas-cooling pipe element, and the communication holes that provide communication between the cooling fluid passageway and the outside are closed with plugs, and are provided above the cooling fluid passageway in the vertical direction, and the axis direction of the communication holes is angled to the vertical direction.

The exhaust gas-cooling pipe element is manufactured by a casting process that employs a core, or the like. The cooling fluid passageway is formed within the pipe wall by disassembling the core and removing it through the communication holes that are provided for removing cores. After the core is removed, the communication holes that provide communication between the cooling fluid passageway and the outside are closed with the plugs. However, when the communication holes are closed with the plugs, recesses tend to be formed around distal end portions of the plugs by the distal end portions and the pipe wall surfaces. Therefore, in the case where the communication holes are located above the cooling fluid passageway in the vertical direction, with their axes lying in the vertical direction, air is likely to remain in the recesses even after the cooling fluid is introduced into the cooling fluid passageway. Due to the presence of such air, when exhaust gas raises the temperature of the exhaust gas-cooling pipe element, the cooling fluid, such as water or the like, is likely to boil starting at a residual air bubble, which gives rise to a possibility of declining the heat exchange efficiency.

In the exhaust gas-cooling pipe element in accordance with the foregoing embodiments, the axis direction of the communication holes is angled to the vertical direction. As a result, the foregoing recess assumes an angle position that facilitates escape of air. Therefore, it is possible to prevent air from promoting the boiling of the cooling fluid. Thus, the decline in the heat exchange efficiency can be prevented, and high cooling efficiency can be maintained.

Besides, as for the exhaust gas-cooling pipe elements of the foregoing embodiments, a portion of the cooling fluid passageway near a region in the pipe wall that is inclined so as to face toward the exhaust introduction opening side is provided with a higher heat absorption capability than other portions of the cooling fluid passageway.

Therefore, exhaust gas from the exhaust ports of the internal combustion engine collides with the region that is inclined so as to face toward the exhaust introduction opening side. Therefore, since the heat absorption capability of a portion of the cooling fluid passageway formed in this region is made higher than those of other portions, exhaust gas can be efficiently cooled, and the cooling efficiency can be enhanced.

Besides, in exhaust gas-cooling pipe elements in some of the embodiments, the portion of the cooling fluid passageway that is formed in the foregoing region of the pipe wall is provided with higher heat absorption capability than other portions of the cooling fluid passageway by making the capacity of that portion of the cooling fluid passageway larger than the capacities of the other portions.

Thus, the heat absorption capability of the portion of the cooling fluid passageway which is obliquely inclined so as to face toward the exhaust introduction opening side can be enhanced by making the capacity of the portion larger than the capacities of the other portions. Therefore, exhaust gas can be effectively cooled, so that the cooling efficiency can be enhanced.

Besides, in the exhaust gas-cooling pipe elements of some of the foregoing embodiments, the heat absorption capability of the portion of the cooling fluid passageway which is formed in the region that is inclined so as to face toward the exhaust introduction opening side is made higher than the heat absorption capabilities of the other portions of the cooling fluid passageway by providing a difference between the flow speed of the cooling fluid in that portion and the flowing speed of the cooling fluid in the other portions.

Thus, by providing a difference between the flow speed of the cooling fluid in the portion of the cooling fluid passageway which is inclined so as to face toward the exhaust introduction opening side and the flow speed of the cooling fluid in the other portions of the cooling fluid passageway, the heat absorption capability of that portion can be enhanced. Therefore, exhaust gas can be effectively cooled, so that the cooling efficiency can be enhanced.

Besides, in the exhaust gas-cooling pipe elements of some of the foregoing embodiments, the heat absorption capability of the portion of the cooling fluid passageway which is formed in the foregoing region in the pipe wall is made higher than the heat absorption capabilities of the other portions of the cooling fluid passageway by making the flow speed of the cooling fluid in that portion higher than the flow speeds thereof in the other portions.

Concretely, the flow speed of the cooling fluid in the portion of the cooling fluid passageway that is inclined so as to face toward the exhaust introduction opening side is made higher than the flow speed of the cooling fluid in the other portions so that the heat absorption capability of that portion can be enhanced. Therefore, exhaust gas can be effectively cooled, so that the cooling efficiency can be enhanced.

Besides, in the exhaust gas-cooling pipe elements of the foregoing embodiments, the cooling fluid passageway is supplied with cooling water as a cooling fluid.

Besides, in the exhaust cooling pipe elements of the foregoing embodiments, the cooling water may be cooling water for use for the internal combustion engine.

For the cooling water for the exhaust gas-cooling pipe element, the cooling water for the internal combustion engine may be utilized. Thus, by utilizing a common construction of the cooling system of the internal combustion engine, exhaust gas can be efficiency cooled in the exhaust gas-cooling pipe element.

Besides, an internal combustion engine exhaust system employs any one of the exhaust gas-cooling pipe element of the foregoing embodiments between the exhaust ports of the engine and the exhaust branch pipes.

By using any one of the exhaust cooling pipe elements of the foregoing embodiments in the internal combustion engine exhaust system, the exhaust cooling efficiency can be enhanced and the backflow of condensate water to the engine side can be prevented.

Besides, the foregoing internal combustion engine exhaust system is an exhaust system of an internal combustion engine in which an exhaust gas-cooling pipe element is disposed between the exhaust ports and the exhaust branch pipes, and the opening portions of the exhaust ports and the opening portions of the exhaust branch pipes which are connected by the exhaust gas-cooling pipe element are disposed so that the opening portions of the exhaust ports are above, in the vertical direction, the opening portions of the exhaust branch pipes.

According to the exhaust system in which the exhaust gas-cooling pipe element is disposed as described above, condensate water, if any is formed within the exhaust gas-cooling pipe element, flows toward the exhaust branch pipe side, not toward the internal combustion engine side. Thus, the back flow of condensate water can be prevented.

Besides, in the internal combustion engine exhaust systems in accordance with the foregoing embodiments, the cooling fluid passageway is formed within the pipe wall of the exhaust gas-cooling pipe element, and the communication holes that provide communication between the cooling fluid passageway and the outside are closed with plugs, and are provided above the cooling fluid passageway in the vertical direction, and the axis direction of the communication holes is angled to the vertical direction.

As mentioned above, the exhaust gas-cooling pipe element is manufactured by a casting process that employs a core, or the like. In the manufacturing process, after the core is disassembled and removed, the communication holes that provide communication between the cooling fluid passageway and the outside are closed with the plugs. In the case where the communication holes are located above the cooling fluid passageway in the vertical direction, air is likely to remain in recesses that are formed between the plugs and the hole surfaces of the communication holes. Such air may possibly promote the boiling of the cooling fluid and may therefore decline the heat exchange efficiency.

In the internal combustion engine exhaust systems of the foregoing embodiments, since the axis direction of the communication holes of the exhaust gas-cooling pipe element is angled to the vertical direction, the recesses assume an angle position that facilitates the relief of air. Therefore, the promotion of the boiling of the cooling fluid by air is prevented, so that decline of the heat exchange efficiency can be prevented, the efficiency of cooling the internal combustion engine exhaust system in the internal combustion engine exhaust system can be kept high.

Besides, in the internal combustion engines in accordance with the foregoing embodiments, the cooling fluid passageway is supplied with cooling water as a cooling fluid.

Besides, in the internal combustion engines of the foregoing embodiments, the cooling water may be cooling water for use for the internal combustion engine. For the cooling water, the cooling water for the internal combustion engine may be utilized. Thus, by utilizing a common construction of the cooling system of the internal combustion engine, exhaust gas can be efficiency cooled in the exhaust gas-cooling pipe element.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. An internal combustion engine exhaust system comprising:
    an exhaust gas-cooling pipe element provided between an exhaust port and an exhaust branch pipe, the exhaust gas-cooling element having a plurality of exhaust channels, each of the plurality of exhaust channels has an exhaust introduction opening and an exhaust discharge opening;
    wherein an opening portion of the exhaust port and an opening portion of the exhaust branch pipe that are connected by each of the exhaust gas-cooling channels of the exhaust gas-cooling pipe element are disposed so that the opening portion of the exhaust port is positioned above the opening portion of the exhaust branch pipe in a vertical direction, and
    wherein a central axis of the opening of the exhaust port and a center axis of the opening of the exhaust branch pipe are non-parallel to each other,
    wherein the exhaust gas-cooling pipe element includes a pipe wall in which a cooling fluid passageway and a communication hole are formed, the communication hole provides communication between the cooling fluid passageway and an outside, the communication hole is closed with a plug, the communication hole is provided above the cooling fluid passageway in the vertical direction, and an axis direction of the communication hole is angled to the vertical direction.

2. The internal combustion engine exhaust system according to claim 1, wherein the cooling fluid passageway is supplied with cooling water as a cooling fluid.

3. The internal combustion engine exhaust system according to claim 2, wherein the cooling water is cooling water for use for an internal combustion engine.

4. An exhaust gas-cooling pipe element provided between an exhaust port of an internal combustion engine and an exhaust branch pipe, comprising:
    a plurality of exhaust channels, each of the plurality of exhaust channels has an exhaust introduction opening and an exhaust discharge opening;
    wherein a center axis of each of the exhaust introduction openings that are connected to the exhaust port and a center axis of each of the exhaust discharge openings that are connected to the exhaust branch pipe are placed out of alignment with each other, the center axis of each of the exhaust introduction openings and the center axis of each of the exhaust discharge openings are non-parallel to each other,
    wherein when each of the exhaust introduction openings are connected to the exhaust port of the internal combustion engine, each of the exhaust discharge openings are below each of the exhaust introduction openings in a vertical direction,
    wherein the exhaust gas-cooling pipe element includes a pipe wall in which a cooling fluid passageway and a communication hole are formed, the communication hole provides communication between the cooling fluid passageway and the outside, and the communication hole is closed with a plug, the communication hole is provided above the cooling fluid passageway in the vertical direction, and an axis direction of the communication hole is angled in the vertical direction.

5. The exhaust gas-cooling pipe element according to claim 4, wherein the cooling fluid passageway is supplied with cooling water as the cooling fluid.

6. The exhaust gas-cooling pipe element according to claim 5, wherein the cooling water is cooling water for use for the internal combustion engine.

7. The exhaust gas-cooling pipe element according to claim 4, wherein in the pipe wall of the exhaust gas-cooling pipe element, a portion of the cooling fluid passageway which is formed in a region of the pipe wall which is inclined obliquely so as to face toward an exhaust introduction opening side, the portion of the cooling fluid passageway is provided with higher heat absorption capability than another portion of the cooling fluid passageway.

8. The exhaust gas-cooling pipe element according to claim 7, wherein the portion of the cooling fluid passageway which is formed in the region is provided with higher heat absorption capability than the another portion of the cooling fluid passageway by making a capacity of the portion of the cooling fluid passageway larger than a capacity of the another portion of the cooling fluid passageway.

9. The exhaust gas-cooling pipe element according to claim 7, wherein the portion of the cooling fluid passageway which is formed in the region is provided with higher heat absorption capability than the another portion of the cooling fluid passageway by providing a difference between flow speed of a cooling fluid in the portion of the cooling fluid passageway and flow speed of the cooling fluid in the another portion of the cooling fluid passageway.

10. The exhaust gas-cooling pipe element according to claim 9, wherein the portion of the cooling fluid passageway which is formed in the region is provided with higher heat absorption capability than the another portion of the cooling fluid passageway by making the flow speed of the cooling fluid in the portion higher than the flow speed of the cooling fluid in the another portion.

11. An internal combustion engine exhaust system comprising the exhaust gas-cooling pipe element according to claim 4 between the exhaust port of the internal combustion engine and the exhaust branch pipe.

* * * * *